(12) United States Patent
Zetts

(10) Patent No.: US 6,738,427 B2
(45) Date of Patent: May 18, 2004

(54) SYSTEM AND METHOD OF PROCESSING MPEG STREAMS FOR TIMECODE PACKET INSERTION

(75) Inventor: John Mark Zetts, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 09/850,201

(22) Filed: May 7, 2001

(65) Prior Publication Data

US 2002/0034255 A1 Mar. 21, 2002

Related U.S. Application Data

(60) Provisional application No. 60/232,893, filed on Sep. 15, 2000.

(51) Int. Cl.[7] .......................... H04N 7/12; H04N 11/02
(52) U.S. Cl. ........................ 375/240.28; 375/240.26
(58) Field of Search .......................... 725/91, 93, 94, 725/100; 348/518; 375/240.26, 240.28

(56) References Cited

U.S. PATENT DOCUMENTS

| | | | |
|---|---|---|---|
| 5,598,415 A | 1/1997 | Nuber et al. | 370/474 |
| 5,742,623 A | 4/1998 | Nuber et al. | 371/47.1 |
| 5,835,493 A | 11/1998 | Magee et al. | 370/394 |
| 6,002,687 A | 12/1999 | Magee et al. | 370/394 |
| 6,453,112 B2 * | 9/2002 | Imahashi et al. | 386/46 |
| 6,493,872 B1 * | 12/2002 | Rangan et al. | 725/32 |

* cited by examiner

*Primary Examiner*—Chris Kelley
*Assistant Examiner*—George A Bugg
(74) *Attorney, Agent, or Firm*—Sandra M. Parker, Esq.

(57) ABSTRACT

A method, system and article of manufacture is provided for processing a previously encoded MPEG video file for frame accurate timecode identification of each individual video frame. For each frame of the MPEG video file, the method creates a compressed timecode packet having an identifying signature, an absolute timecode of the frame, and a relative timecode of the frame, wherein the timecodes have the SMPTE timecode format HH:MM:SS:FF. Next, the MPEG video file is modified by inserting in a header of each frame of the MPEG video file the corresponding compressed timecode packet, while maintaining the MPEG video file's original frame presentation timing, thereby preserving the MPEG compliance and compressed audio/video data of the MPEG video file. The timecode packet is preferably automatically inserted in a user data packet of the frame, between the picture start header and the first slice header.

12 Claims, 22 Drawing Sheets

FIG. 3    ORIGINAL MPEG FILE    PROCESSED MPEG FILE

TIMECODE PACKET

| Block | Offset | Format | Value |
|---|---|---|---|
| 500 — USER DATA START CODE (4 BYTES) | 0 | 0000 0000 | 0X00 |
| | 1 | 0000 0000 | 0X00 |
| | 2 | 0000 0001 | 0X01 |
| | 3 | 1011 0010 | 0XB2 |
| 505 — SIGNATURE (2 BYTES) | 4 | 1010 1010 | 0XAA |
| | 5 | 1010 10EP | 0XA8 |
| 510 — RELATIVE TIMECODE (3 BYTES) | 6 | BHHH HHMM | |
| | 7 | MMMM SSSS | |
| | 8 | SSXF FFFF | |
| 515 — ABSOLUTE TIMECODE (3 BYTES) | 9 | GHHH HHMM | |
| | 10 | MMMM SSSS | |
| | 11 | XSSF FFFF | |
| 520 — PICTURE PTS (4 BYTES) | 12 | PPPP PPPP | |
| | 13 | PPPP XPPP | |
| | 14 | PPPP PPPP | |
| | 15 | PPPP PPPP | |
| 525 — PICTURE TYPE/REF (1 BYTE) | 16 | PTTR RRRR | |
| 530 — CHECKSUM (1 BYTE) | 17 | CCCC CCCC | |
| 535 — OPTIONAL PADDING (2 BYTES) | 18 | 1111 1111 | |
| | 19 | 1111 1111 | |

LEGEND

X = MARKERS  
F = FRAMES  
H = HOURS  
M = MINUTES  
S = SECONDS  
E = ESTIMATED PTS FLAG

P = PTS  
T = PICTURE TYPE  
R = PICTURE REFERENCE  
C = CHECKSUM  
B = THUMBNAIL TAKEN FLAG  
G = NO RIGHTS FLAG

FIG. 5

SYSTEM AND METHOD OF PROCESSING MPEG STREAMS FOR TIMECODE PACKET INSERTION

This application claims the benefit of U.S. Provisional Patent Application entitled "Apparati and Methods For Processing MPEG Streams" by the same inventor, serial No. 60/232,893, filed on Sep. 15, 2000.

The present invention is related to co-pending applications entitled: "System and Method of Processing MPEG Streams For File Index Insertion" Ser. No. 09/860,700, filed on May 18, 2001, "System and Method of Timecode Repair and Synchronization in MPEG Streams" Ser. No. 09/850,253, filed on May 7, 2001, and "System and Method of Processing MPEG Streams For Storyboard and Rights Metadata Insertion" Ser. No. 09/850,522, filed on May 7, 2001, all assigned to the assignee of the present invention and fully incorporated herein by reference.

BACKGROUND OF THE INVENTION

1. Field of the Invention

The present invention relates generally to the compression, cataloging and viewing of full motion videos and, more particularly, to the processing of compressed video data.

2. Description of Related Art

The infrastructure and process required to create and operate a video archive in the digital domain are well known in the broadcast video industry. The archiving process generally begins by digitizing and compressing the analog video using MPEG-1 or MPEG-2 compression, then moving the compressed video file to a long term storage. To preserve the contribution quality of the video, broadcasters generally select a high compressed bitrate (i.e., 15–40 Mbps), which allows the original video to be recovered with relatively high fidelity in spite of the lossiness of the MPEG compression scheme.

The high bitrate of the compressed video, however, presents considerable problems to the broadcaster's local area network and computer workstation infrastructure, when the video must be distributed for viewing and post-production work. The high network bandwidth and the amount of time required to transfer the assets throughout the plant places an upper limit on the number of concurrent transfers and severely constrains productivity. In response to this bandwidth problem, broadcasters create an additional copy of the video at a much lower compressed bitrate (i.e., 1.5–4 Mbps). This low bitrate file, referred to as a 'proxy' or 'browse' file, enables users to quickly download the video or to view it directly on computer monitors by utilizing a streaming video server. To facilitate the viewing of video assets outside the local area network, a second proxy file is often encoded at a very low bitrate (56–1000 Kbps), for streaming over low speed terrestrial lines.

After ingestion of the video, the next step in the archiving process is to create an entry for the video in the video library catalog. This entry contains metadata, which is information pertinent to the video. The contents and format of a video catalog record, normally broadcaster unique, facilitate the search and retrieval of video clips within the broadcaster's video library. Presently, there are commercially available video catalog applications (catalogers) that will automatically extract from an MPEG-1 or MPEG-2 video file metadata, such as closed caption text and the text of the actual audio program, obtained via speech recognition technology. Catalogers further extract metadata from the video by performing scene change analysis and creating a bitmap of the first frame after each cut or major scene transition. These bitmaps, referred to individually as a 'thumbnail' or collectively as a storyboard, are considered essential metadata because they enable the end user to determine very quickly the video content. Absent the storyboard, the end user is forced to view the video or, at a minimum, fast forward through a video, to find the desired video segment. An additional feature of prior art catalogers is the capability to randomly access and play the proxy video file by double clicking on a storyboard thumbnail.

Further productivity gains can be achieved if the proxy file is a replica of the high-resolution video, where both files begin on the same video frame and have equal duration. When the browse file is a true proxy, a video production engineer is able to import several proxy files into a video editor and produce a program, creating an edit decision list (EDL). This EDL is subsequently exported to a high quality video editing suite that downloads the high-resolution version of the videos from the archive and executes the EDL to produce the air-ready material. Ideally, the broadcast editing suite retrieves from the broadcast server or archive only those segments of the high-resolution file that are specified in the EDL.

Producing a high-resolution video and one or more frame accurate proxy files is problematic because two or more MPEG encoders and a source playout device must be started frame accurately, and the encoders must be capable of extracting SMPTE timecode from the vertical blanking interval and storing the timecode in the MPEG Group of Pictures (GOP) header, although some broadcasters may allow the encoders to encode alternately the locally produced house SMPTE timecode. Moreover, the encoders must not drop or repeat any frames during the encoding process, and the encoders must stop on the same video frame.

Although there are commercially available MPEG encoders that are capable of producing such proxy files, these encoders are very expensive and are not economical for a broadcaster planning to operate many ingest stations. Moreover, these high-end encoders store the MPEG data in a vendor proprietary elementary stream format, which makes them uninteroperable with other MPEG decoders. Thus, video files sent to another broadcast facility must be first remultiplexed into a MPEG compliant format. Moreover, it is undesirable from a business perspective to use a nonstandard storage format. Furthermore, video quality and reliability are the normal criteria for selecting an encoder vendor. Clearly, a need exists to create proxy files using good quality, but less capable, MPEG encoders. An encoder that fails to store SMPTE time in the GOP header, for example, should not be eliminated from consideration, if it meets all other broadcaster requirements.

There is a obviously a need for recording SMPTE timecodes. However, there are problems that occur when dealing with recording timecodes. There are two timecodes associated with every video: an absolute and relative timecode. The absolute timecode is the SMPTE timecode recorded as the video is being shot. It usually reflects the actual time of day, but if the camera operator fails to properly set the SMPTE timecode generator on the camera, it may indicate any random clock time. Reporters and producers taking notes will record the SMPTE timecode while filming, to enable them to quickly find important footage during post-production. It is for this reason that many archive librarians insist on preserving the absolute timecode as essential metadata when compressing and cataloging video. However, the absolute timecode on a source video tape can be anomalous (e.g., missing, discontinuous, jump backwards in time, non-incrementing, non-drop frame mode, etc.).

The relative timecode is a timecode that is relative to the start of the video, and is often referred to as elapsed time. Many producers prefer to use relative timecode instead of absolute timecode during editing sessions, because it can simplify the arithmetic associated with calculating video clip duration. More importantly, it is more dependable than the absolute timecode.

The syntax and semantics of MPEG-2 are described in detail in the Moving Pictures Expert's Group (MPEG) standard entitled Coding of Moving Pictures and Associated Audio ITU Recommendation H.262, which is incorporated herein by reference. One of the shortcomings of the MPEG standard is that only one timecode is recorded, and this timecode is placed in the GOP header that typically occurs every 12–15 frames. Thus, if the absolute timecode abruptly changes between the two GOP headers, the change in SMPTE time is not registered until the next GOP header, and therefore the MPEG file does not accurately reflect the absolute timecode of the source. This mismatch in SMPTE time would result in EDL errors, if absolute timecode were to be used when editing with the proxy file. Some vendor MPEG encoders are capable of recording the timecode of each frame in a user defined data field within the video data. However, there is no standard for formatting these data, and only the vendor's own decoder is capable of decoding the user data packets. Therefore, there is a present need for encoding both absolute and relative timecode into a proxy file on a frame basis, which will accurately reflect the timecodes of the associated high-resolution video file.

There is also a need for recording timecodes in non-proxy files. Many broadcasters have an established video archive of medium-to-low resolution MPEG files in various formats for which there are no matching high-resolution files. These standalone video files are used to browse or search a video collection which is maintained on analog/digital tape. In order to located the original source, the MPEG browse file must contain the absolute timecode. It would be cost prohibitive for a broadcaster with hundreds or thousands of hours of tape to re-encode the archived video in order to insert proper timecode. Accordingly, there is a need to process existing MPEG assets and retrofit them with accurate timecode information.

Moreover, to satisfy industry requirements, an MPEG player must be configurable to display both absolute and relative SMPTE timecodes, that are accurate to the video frame. Even though an MPEG browse file may contain an absolute timecode in the GOP header, it is the relative timecode that is needed for building EDLs. Conventional MPEG players access the presentation timestamp (PTS) in the program elementary stream (PES) headers to calculate elapsed time. However, this PTS is not the true SMPTE drop-frame time, expressed in SMPTE HH:MM:SS:FF format, where "FF" indicates a frame number. Thus, the PTS must be converted to SMPTE, which requires the player to be cognizant of the frame rate and the frame counting mode, which may not be correctly set in the MPEG stream. Additionally, the PTS value is not accurate, since it is a snapshot of the system clock reference (SCR), which is started a few hundred milliseconds prior to the first frame.

Although there are vendor encoders that place timecode data in user data fields, these data are proprietary. Furthermore, an encoder with this timecode insertion feature may not offer optimum compression. Moreover, the conventional encoders fail to address the need for inserting SMPTE timecode into MPEG encoded files, created by any vendor MPEG encoder, for the purpose of obtaining a frame accurate timecode identification. Additionally, any technique used to encode timecode information must ensure that the timecode data can be extracted by the MPEG decoder when operating in trick mode, or when randomly accessing the video file. Also, no prior art system has provided a method of processing MPEG files to embed video frame timing data in a manner that does not alter the original presentation timing, while ensuring error-free decoding.

Therefore, a need exists for the post-encoding insertion of absolute and relative, frame accurate, timecodes into MPEG files in each frame, wherein the timecodes are the true SMPTE drop-frame timecodes expressed in HH:MM:SS:FF format. It is also desirable to encode both absolute and relative timecode into a proxy file on a frame basis, which will accurately reflect the timecodes of the associated high-resolution video file.

SUMMARY OF THE INVENTION

The foregoing and other objects, features, and advantages of the present invention will be apparent from the following detailed description of the preferred embodiments which makes reference to several drawing figures.

One preferred embodiment of the present invention is a method of processing a previously encoded MPEG video file for frame accurate timecode identification of each individual video frame. The method has the following steps:

(a) for each video frame of the MPEG video file, creating a compressed timecode packet having an identifying signature, an absolute timecode of the frame, a relative timecode of the frame, a picture type and a picture reference, wherein the timecodes having the SMPTE timecode format HH:MM:SS:FF; and (b) modifying the MPEG video file by inserting in a header of each video frame of the MPEG video file the corresponding compressed timecode packet, while maintaining the MPEG video file's original frame presentation timing, thereby preserving the MPEG compliance and compressed audio/video data of the video file.

The timecode packet is automatically inserted in a user data packet of the video frame, between a picture start header and a first slice header. The step of inserting the timecode packet preferably includes a step of periodically removing the MPEG video file unused data bytes, equal in number with the inserted timecode packet bytes, for preserving the MPEG video file original size and multiplex bitrate. Alternatively, the step of inserting the timecode packet includes a step of increasing the MPEG video file original multiplex bitrate, to compensate for additional timecode packet bytes inserted into the MPEG video file.

Another preferred embodiment of the present invention is an apparatus implementing the above-mentioned method embodiment of the present invention.

Yet another preferred embodiment of the present invention is a program storage device readable by a computer tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout:

FIG. 5 illustrates a data structure of a compressed MPEG user data packet containing encoded timecode and framing information structure, according to the preferred embodiments of the present invention;

DETAILED DESCRIPTION OF THE PREFERRED EMBODIMENTS

Figure 1:
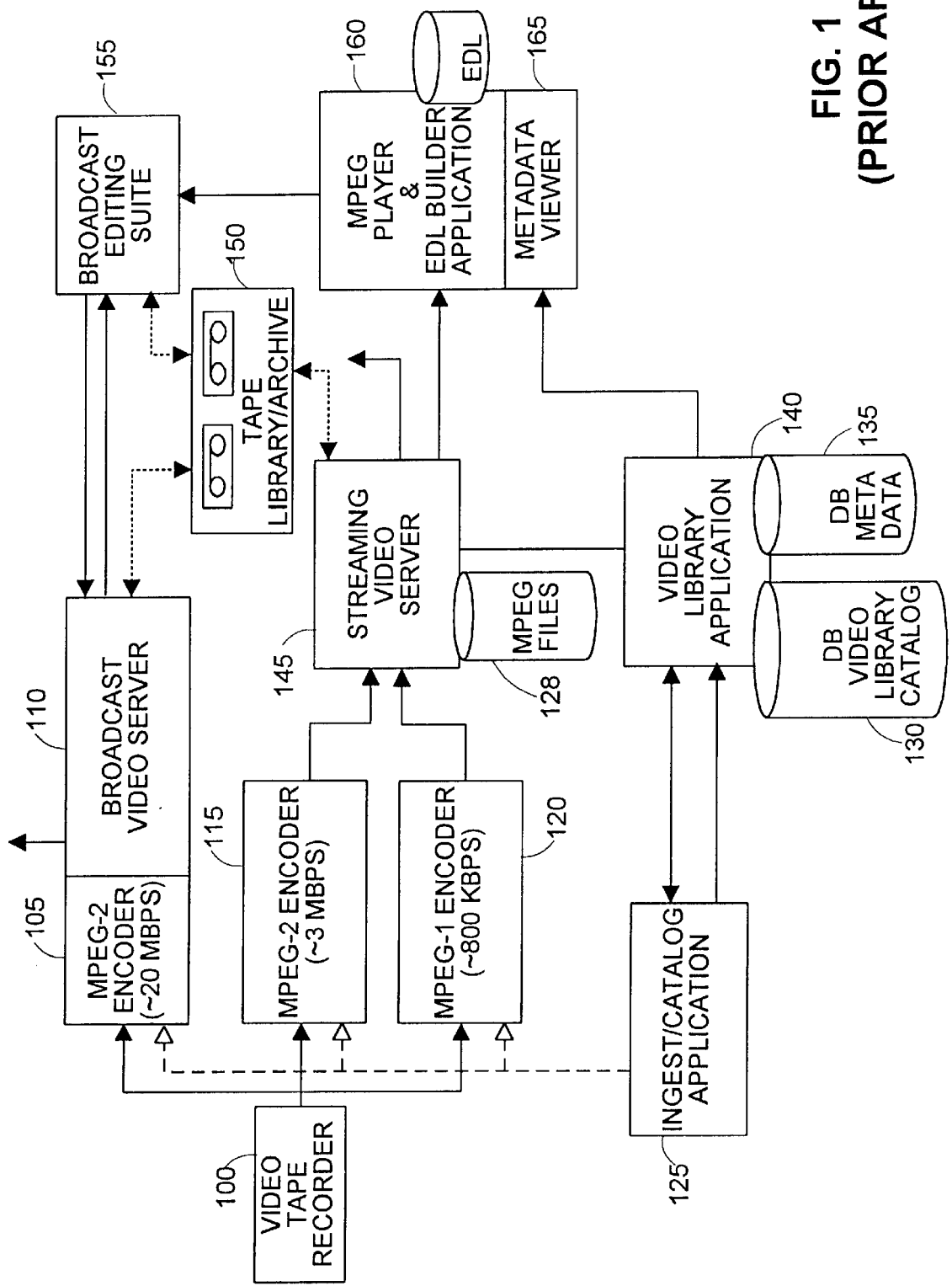
FIG. 1 is an illustration of a conventional video ingest/cataloging system, according to a prior art.

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

The preferred embodiments of the present invention are directed to a system and method for insertion of an absolute timecode and a relative timecode into each frame of a previously encoded MPEG file, wherein the timecodes are accurate and true SMPTE drop-frame timecodes expressed in HH:MM:SS:FF format. The present invention encodes both the absolute and relative timecodes into a previously encoded proxy file on a frame basis, which accurately reflects the timecodes of the associated high-resolution video file. However, it can also be used for recording timecodes in non-proxy, previously existing files.

The preferred embodiments of the present invention insert into each frame of a previously encoded MPEG file a timecode packet containing an absolute and relative timecode, PTS, picture type, and picture reference, without remultiplexing the stream or modifying the original compressed video/audio data, or the PTS and DTS timestamps, while maintaining the original multiplex bitrate and avoiding video buffering verifier (VBV) violations. This is accomplished in a manner that preserves full MPEG compliance, makes the existence of the included timecode packet transparent to MPEG decoders not enabled to extract it, and is useable by any encoder/decoder compliant with MPEG-1 system stream, MPEG-2 program stream, or MPEG-2 transport stream, regardless of its manufacturer. Thus, the timecode packet insertion technique of the present invention functions on any MPEG compliant program stream or transport stream file, independent of decoder and encoder vendor.

Furthermore, the method and system of the present invention can detect and recover from bit errors introduced into the timecode packets, while streaming the MPEG video file over a telecommunications network, and can automate the insertion of the timecode packet into the MPEG video file using a workflow management routine, so that the broadcaster's normal ingest and cataloging procedures remain unchanged, and the processing of the MPEG video file is performed in an efficient manner, requiring only a single read of the file, without replacing or interfering with closed caption or other preexisting user data. Thus, the system and method of the present invention enable the frame accurate identification of each individual video frame, regardless of its play mode or random file access.

In the present invention, an MPEG-1 or MPEG-2 video file is processed to insert a prepared timecode packet after the picture start header of each frame in the video file. Each timecode packet is inserted as an MPEG user data packet (preferably with a user data packet start code 0xB2), which is discarded by MPEG decoders not enabled to decode them. The present invention uniquely marks these timecode packets with a signature that is recognized by any MPEG decoder enabled to extract the user data packets.

The insertion of the timecode packets into the video file may be performed in the present invention by one of the two method embodiments. In one preferred embodiment, as the timecode packets are included into the video file, an equal number of data bytes is removed from the video stream to maintain the constant multiplex bitrate. For this purpose, prior to processing, the video file is analyzed to identify periodic, redundant data which may be transparently removed without adverse effect. In the second embodiment, the multiplex bitrate is increased, preferably by 4800 bits per second, to account for the additional 30 data packets per second. Each system clock reference (SCR) value is modified to accommodate this increase. However, the PTS/DTS values are left unchanged so that the video file maintains its original frame presentation timing. Both techniques maintain the bitrate control of the originating MPEG encoder, precluding VBV underruns and overruns.

The resultant video file remains filly MPEG compliant and the inserted timecode packets have no adverse effect on the operation of other MPEG hardware or software decoders. When the file is decoded by the associated MPEG decoder, the timecode packets are extracted and stored in decoder memory in frame-display order, and made available to the calling player application via an API interface. As each frame is rendered, the application retrieves the associated timecodes for display to the end user.

FIG. 1 is an illustration of a conventional video ingest/cataloging system, according to a prior art. In FIG. 1, a video tape recorder 100 provides a source video for encoding. An ingest/catalog application 125 controls, in parallel, three MPEG encoders 105, 115, 120, which produce a high-resolution video file and two proxies. The high resolution MPEG encoder 105 is integrated with a broadcast video server 110. As the ingest/catalog application 125 creates MPEG files 128 and associated metadata 135, catalog records in a video library catalog 130 are created or updated using a video library application 140. The cataloging and indexing of the video files enables subsequent video file frame search and retrieval.

Upon completion of encoding, the compressed files are moved onto a streaming video server 145 which is capable of isochronous streaming to MPEG decoders/players 160 or FTP transfer of MPEG files, to facilitate decoding directly from a local disk drive. All video content is copied to a tape library/archive 150 for long term storage, and retrieved as necessary. Catalog records are individually examined using a cataloger/metadata viewer 165. The full video or any part thereof may be viewed via the MPEG player 160. The system also incorporates a broadcast editing suite 155.

Figure 2:
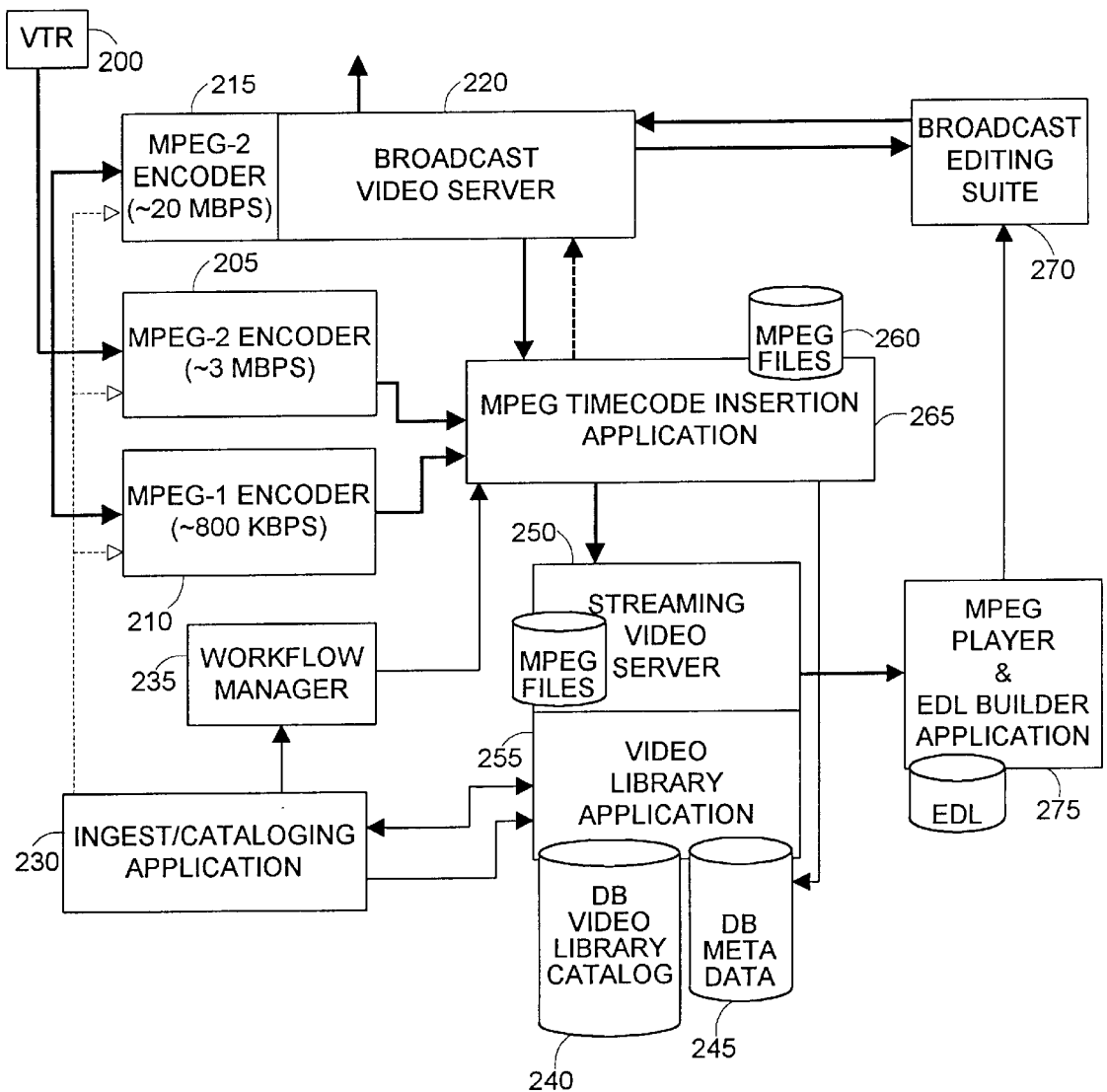
FIG. 2 depicts the placement of the timecode packet insertion application, executing within the video cataloging system, according to a preferred embodiment of the present invention.

FIG. 2 illustrates the system preferred embodiment of the present invention, where an ingest/cataloging application 230 receives a catalog record from a video library catalog file 240, and updates the metadata in a metadata file 245 of a video library application 255. The invocation of a time-code packet insertion application (TPIA) 265 of the present invention is automatically triggered by a workflow manager 235, upon receiving notification from the ingest/cataloging application 230 that encoding has been completed. In FIG. 2, there is a video tape recorder 200 and an MPEG-2 encoder 215. Proxy files produced by two low resolution encoders, MPEG-2 encoder 205, and MPEG-1 encoder 210, are stored on a hard drive 260 of a separate server having the TPIA 265, to be processed by the TPIA. As the ingest/cataloging application 230 signals job completions to the workflow manager 235, the workflow manager 235 in turn invokes the TPIA 265, which inserts the timecode packet in front of each picture in the MPEG file, then copies the modified file to a streaming video server 250. If the application invoking the TPIA 265 does not pass at the start a timecode, or if the high-resolution video file contains non-continuous timecode, the repair/synchronization process necessitates the retrieval of the video file from a broadcast video server 220, in order to read the timecodes encoded by a high-resolution MPEG encoder. The timecodes of the high-resolution file may be read from the GOP headers or, alternatively, from vendor specific timecode storage areas. The preferred embodiment of FIG. 2 may also include a broadcast editing suite 270, and an MPEG player 275.

Figure 3:
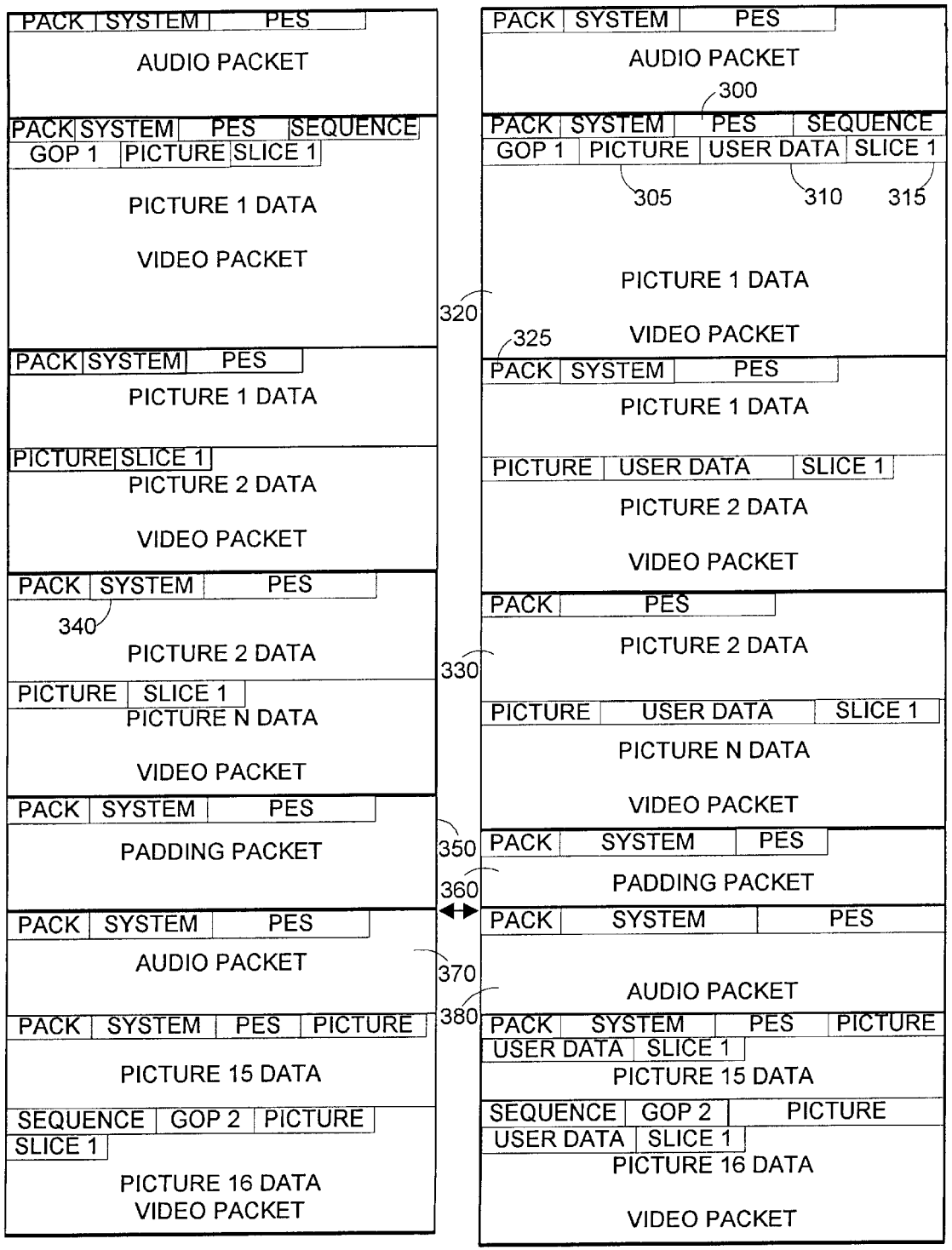
FIG. 3 illustrates the formatting of an MPEG file as originally encoded, and with timecode packets inserted according to one preferred embodiment of the present invention, while maintaining the same bitrate and file length.

FIG. 3 illustrates the formatting of an MPEG file as originally encoded, and with timecode packets inserted according to one preferred embodiment of the present invention, which maintains the same bitrate and file length. Thus, FIG. 3 provides a high level, non-scaled illustration of the MPEG file format before and after timecode packet insertion, when the original multiplex bitrate and file size is maintained. In a video packet 320, after a PES header 300, an 18-byte timecode packet, formatted as a user data packet 310, is placed between a picture header 305 and a first slice 315 of each frame. In the same video packet 320, the length field of the PES header 300 is increased to account for the added timecode packet bytes. The added bytes further require an increase in the SCR value contained in the next video pack header 325. In the third video packet 330, the system header 340, present in the original file, had to be removed from the processed MPEG file, to compensate for the added timecode packet bytes and control the SCR jitter, when needed. Moreover, when the first padding packet 360 is encountered, it is reduced in size to balance out the remaining surplus of timecode packet bytes. This causes the SCR value of the subsequent audio packet 380 to be the same as the SCR value in the original MPEG file audio packet 370. The processing of the MPEG file continues in a similar fashion where the SCR values diverge as a surplus of bytes is accrued, then synchronize as padding bytes are periodically discarded. The present invention begins to discard pack and system headers when the difference between the two SCRs becomes greater than a preset jitter threshold, which is calculated at 750 microseconds, but may have another value.

Figure 4:
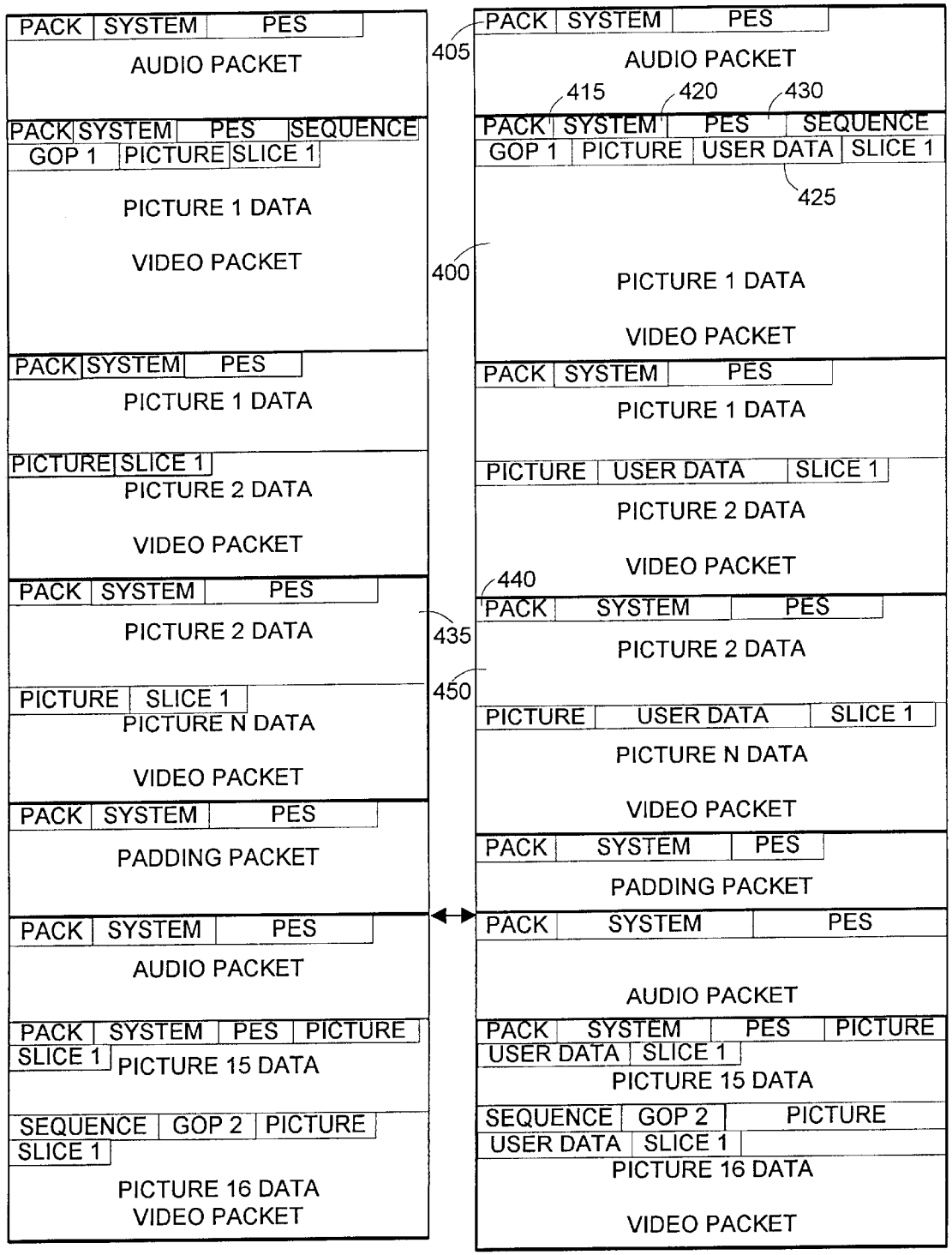
FIG. 4 illustrates the formatting of an MPEG file as originally encoded, and with timecode packets inserted according to another preferred embodiment of the present invention, when having an increased multiplex bitrate.

FIG. 4 illustrates the formatting of an MPEG file as originally encoded, and with timecode packets inserted according to the alternate preferred embodiment of the present invention, which increases the multiplex bitrate. In this preferred embodiment of the present invention, illustrated in FIG. 4, the multiplex bitrate of the processed MPEG file video packet 400 is adjusted upward by 4800 bits per second, to offset inserted timecode packet bytes 425. Video packet length is increased in a PES header 430. Two MPEG structures must be modified to incorporate the change in bitrate: each packer header 405, 415, 440 is adjusted for SCR and multiplex bitrate, and each system header 420 is adjusted by a rate bound. Using the increased bitrate to counterbalance the inserted timecode packet bytes 425, the processed MPEG file maintains the same PTS/DTS clock values, and the SCRs periodically equalize, as seen in the third video packet 450, corresponding to the original video file third packet 435. The timecode packets of this embodiment are preferably 20 bytes in length, to make the increase in multiplex bitrate a multiple of 400 bits per second, as per the MPEG specification.

FIG. 5 illustrates a data structure of a compressed MPEG user data packet containing the encoded timecode and framing information structure, according to the preferred embodiments of the present invention. The compressed data structure begins with a standard user data start code 500, followed by a unique 22-bit signature 505, that disambiguates the timecode packet data from other user data packets that may be present. Three markers, denoted in FIG. 5 by 'X', are placed throughout the remaining data bytes to prevent start code emulation. These markers are also checked by the decoding MPEG player as part of the signature verification. A relative timecode 510 and an absolute timecode 515 are encoded in the next 6 bytes, followed by a picture PTS 520, and a picture reference and type 525 field. An 8-bit checksum 530 enables the decoder to detect packet bit errors. An optional 2-byte field of padding 535 is only included in the timecode packet when the multiplex rate is increased. Lastly, the timecode packet contains some miscellaneous single-bit flags, denoted by 'E', 'B', and 'D', for use by the TPIA and other applications. FIG. 5 also illustrates a legend and the preferable format and hexadecimal value of each byte of the timecode packet.

Figure 6:
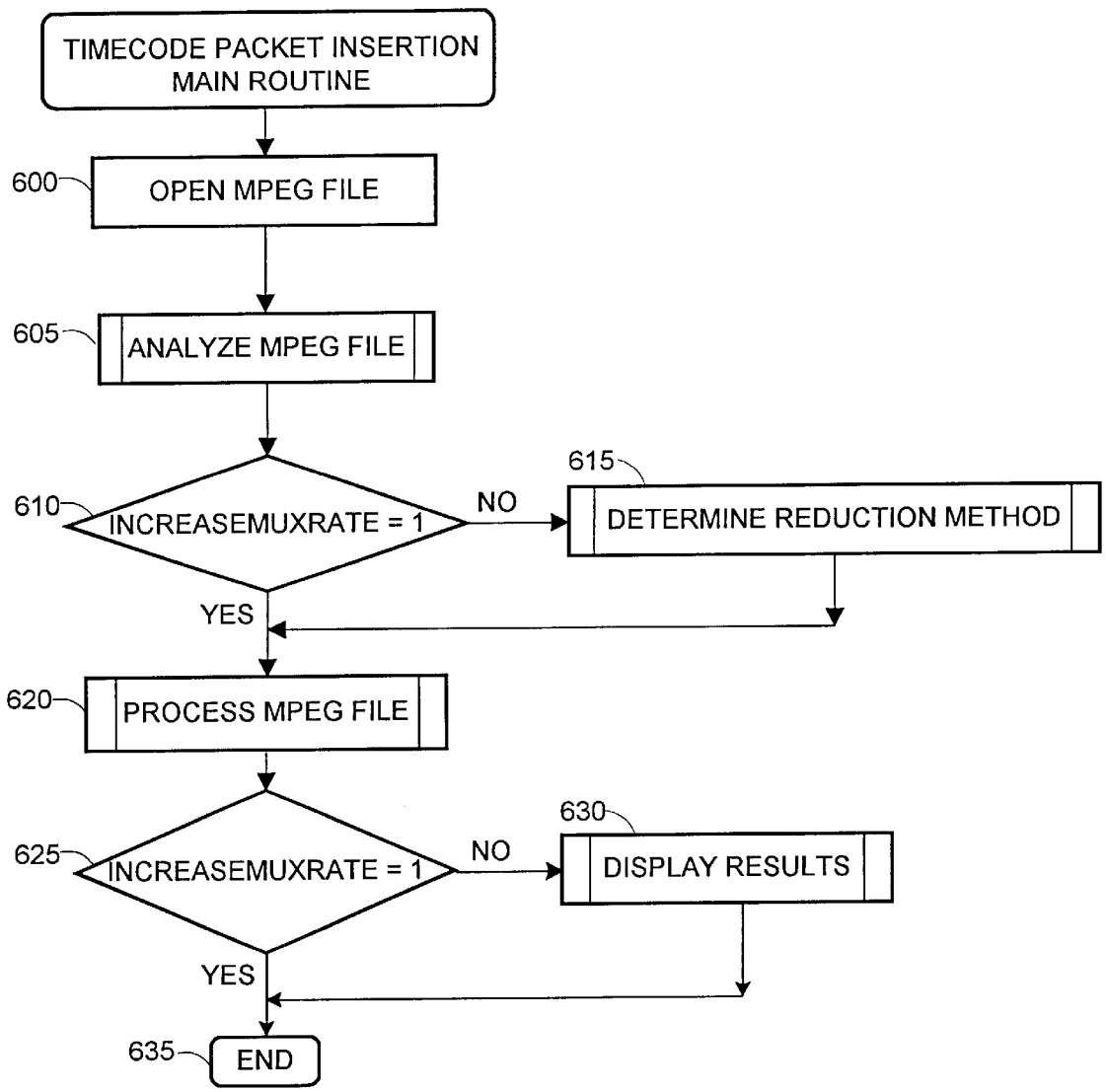
FIG. 6 is a logic flow diagram of the main software routine of the timecode insertion application, according to the preferred embodiments of the present invention.
Figure 7A:
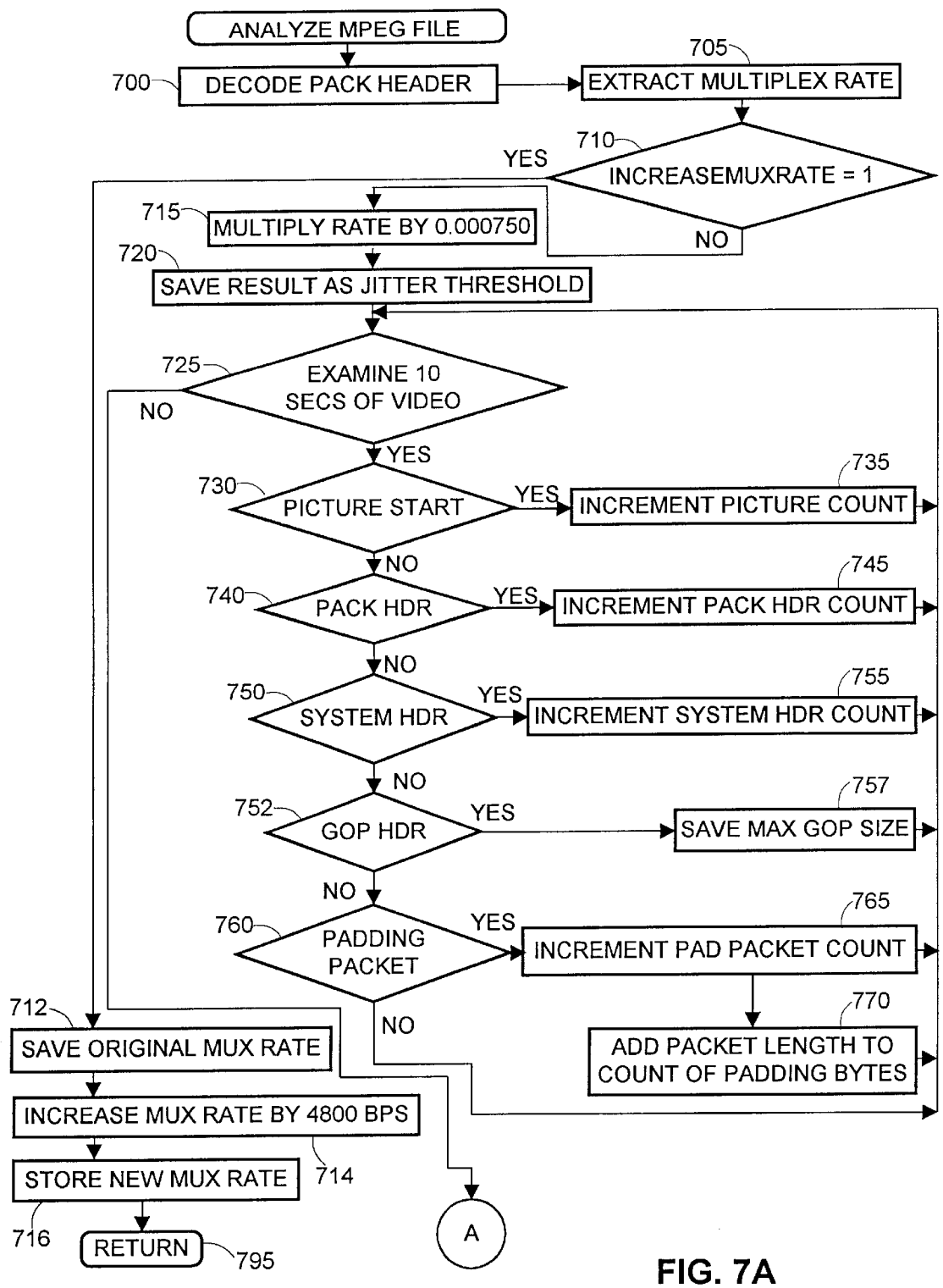
FIGS. 7A and 7B represent a logic flow diagram of a software routine for analyzing an MPEG file to estimate the number and periodicity of pack, system and padding packets, according to the preferred embodiments of the present invention.
Figure 7B:
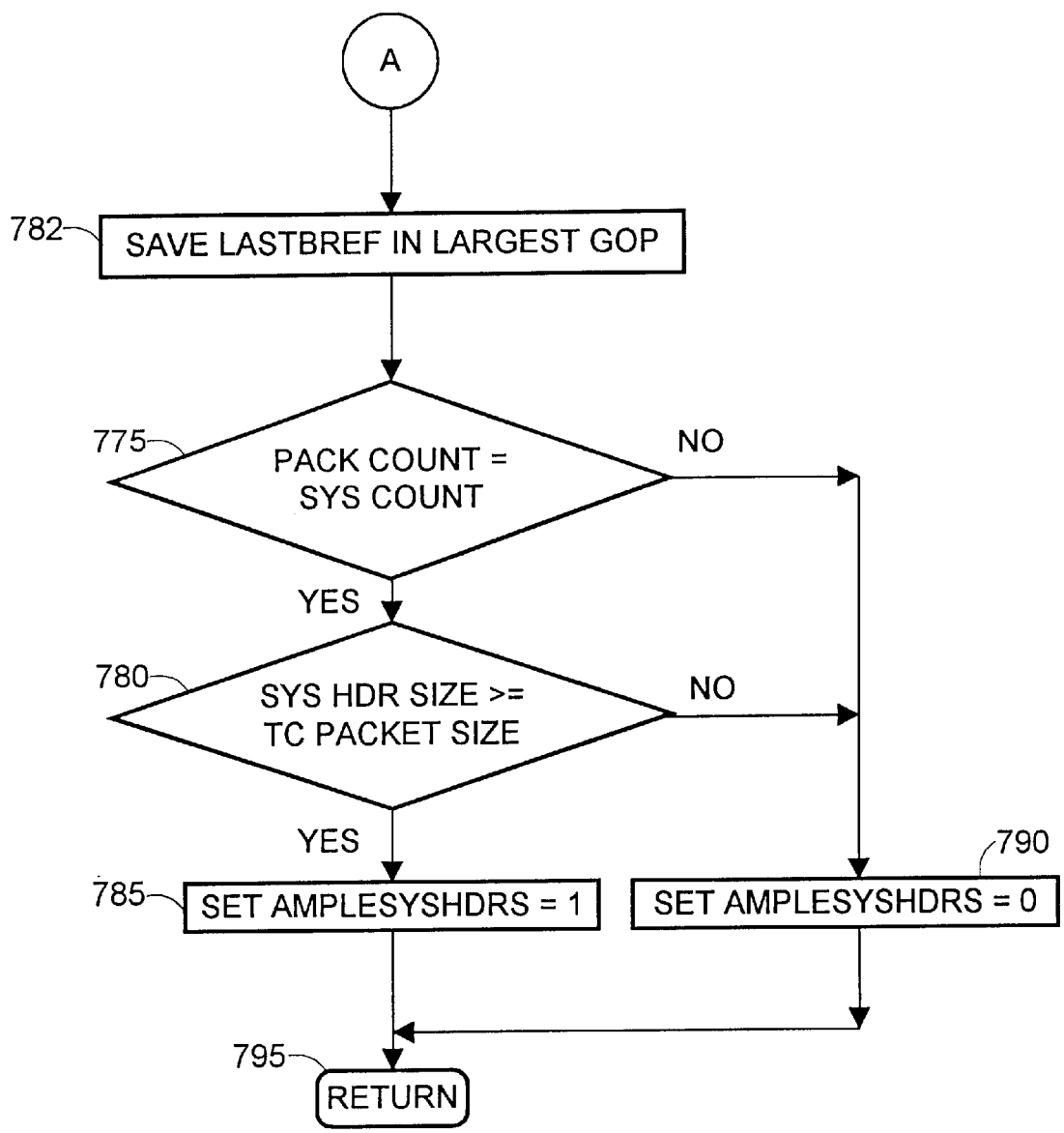

FIG. 6 is a logic flow diagram of the main software routine for the Timecode Packet Insertion Application (TPIA), according to the preferred embodiments of the present invention. FIG. 6 illustrates the main line of logic of the TPIA, used for MPEG file analysis and processing. After opening the MPEG file in step 600, the application calls, in step 605, the Analyze MPEG File routine of FIGS. 7A and 7B, to analyze the first 10 seconds of the video file, in order to estimate the number and periodicity of pack headers, system headers and padding packets. In the Analyze MPEG File routine of FIGS. 7A and 7B, the first found pack header is decoded in step 700, and the stream multiplex bitrate is extracted in step 705. A test is made in step 710 to determine whether the file multiplex bitrate should be increased to absorb the extra timecode packet data.

In the preferred embodiment of the present invention where the bitrate is not increased, the logic falls through to step 715, to calculate the number of bytes contained in a 750 microsecond window at the current bitrate. This result is stored as a jitter threshold in step 720, and will be used to compare the timing drift of the original and modified MPEG files. The logic then enters a loop in step 725, that examines the first 10 seconds of the video file. Within the loop, as each picture start code is detected in step 730, a picture count is incremented in step 735, and the loop iterates. Similarly, as each pack or system header is encountered in steps 740, 750, respectively, a pack header counter and system header counter are incremented in steps 745, 755, respectively. As each group of pictures (GOP) header is found in step 752, the logic determines number of pictures contained in the previous GOP and saves the maximum GOP size in step 757, for the longest GOP yet found. For each padding packet, in step 760 a padding packet counter is incremented in step 765, and in step 770 the packet length is extracted and added to count the total number of padding bytes. All other start codes result in the no condition in step 760, and the logic iterates to find and process the next MPEG start code.

After approximately 10 seconds of video have been examined, the loop exits with the no condition in step 725. The picture reference of the last B frame of the longest GOP is then stored in step 782, and a test is conducted in step 775 to determine if the number of bytes in the timecode packet is equal to the number of bytes in the system header. If this tests true, and the size of the system header is found to be equal to or greater than the size of the timecode packet in step 780, the AmpleSysHdrs flag is set to 1, in step 785. A no condition in either step 775 or 780 results in the AmpleSysHdrs flag being reset to 0, in step 790. The test performed in step 780 normally tests true, because the size of the timecode packet is specifically set to 18 bytes in order to match the size of the standard system header. This test will fail only if the MPEG encoder was configured to encode the file without an audio track, which is an uncommon occurrence. In step 795, the subroutine returns to the caller.

Figure 8:
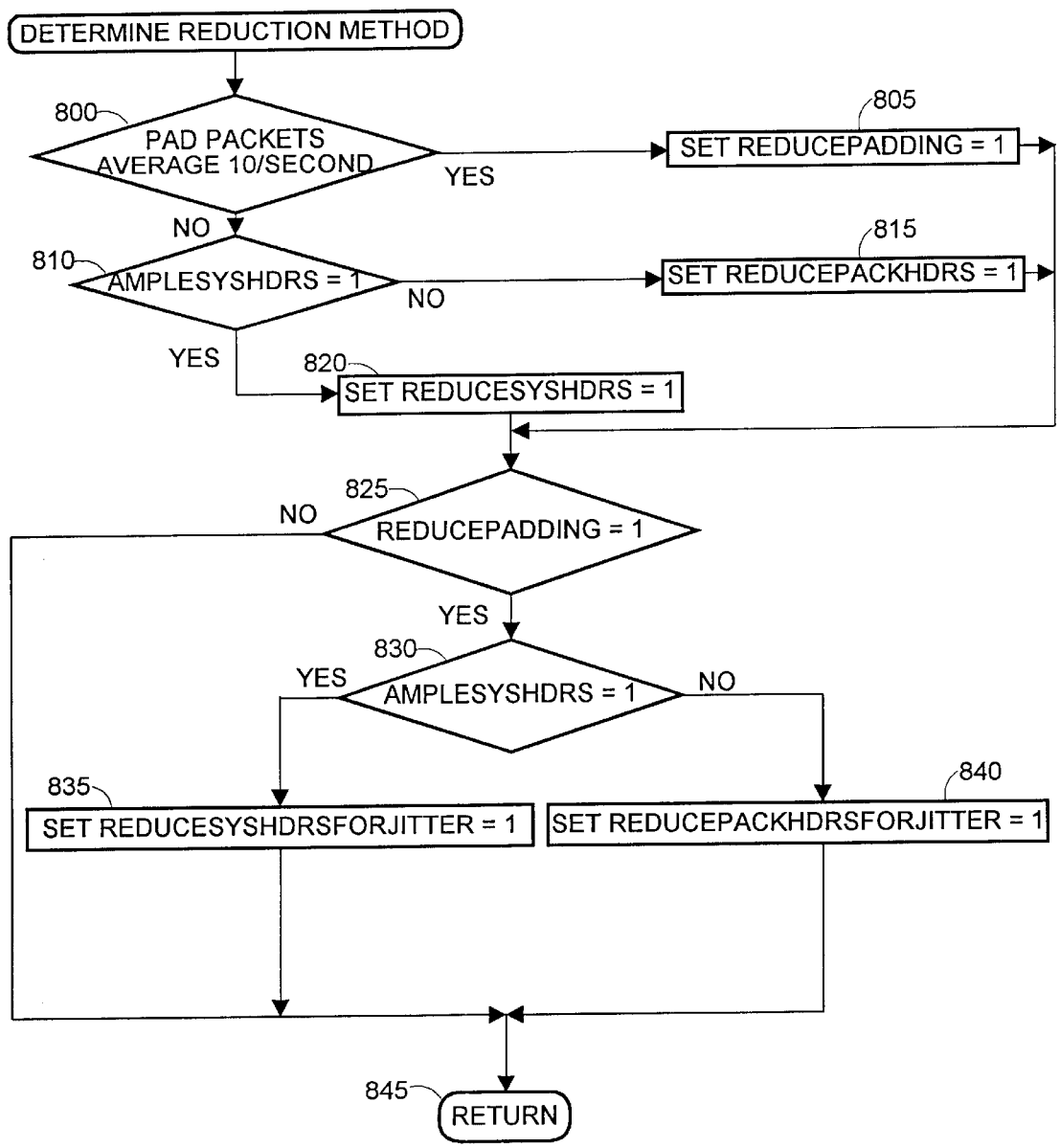
FIG. 8 is a logic flow diagram of a software routine for determining the best method of concealing the removal of redundant data to maintain a constant bitrate, according to the preferred embodiments of the present invention.

Returning to FIG. 6, after analyzing the MPEG file, if the multiplex rate is not being increased, as determined in step 610, the Determine Reduction Method routine of FIG. 8 is called in step 615 to detect and set the mode of data reduction with the most effective concealment. The present invention seeks to usurp padding bytes as a first course of action, and usurps pack and/or system headers only if necessary. Optimally, pack and/or system headers are only removed to control jitter during periods of sparse padding packets. MPEG files encoded with current, commercially available MPEG-1 and MPEG-2 encoders generally have substantial padding spaced at regular intervals, which facilitates this data insertion scheme.

FIG. 8 is a logic flow diagram of a software routine for determining the best method of concealing the removal of redundant data to maintain a constant bitrate, according to the preferred embodiments of the present invention. In the Determine Reduction Method routine of FIG. 8, in step 800 a test is made to determine the periodicity of padding packets. If there were an average of 10 padding packets per second, the ReducePadding global flag is set to 1, in step 805. If there were insufficient padding packets, the availability of system headers is checked in step 810. A yes condition results in setting of the ReduceSystemHdrs global flag to 1, in step 820, which targets systems headers for data reduction. Otherwise, in step 815 the ReducePackHdrs is set to 1, to eliminate unneeded pack headers. Continuing, if padding packets were selected for reduction in step 825, the availability of system headers is again checked in step 830. A yes condition results in setting the ReduceSysHdrsForJitter flag to 1, in step 835. Otherwise, pack headers are used in step 840 to control jitter by setting the ReducePackHdrsForJitter flag to 1, and the routine returns in step 845.

Figure 9:
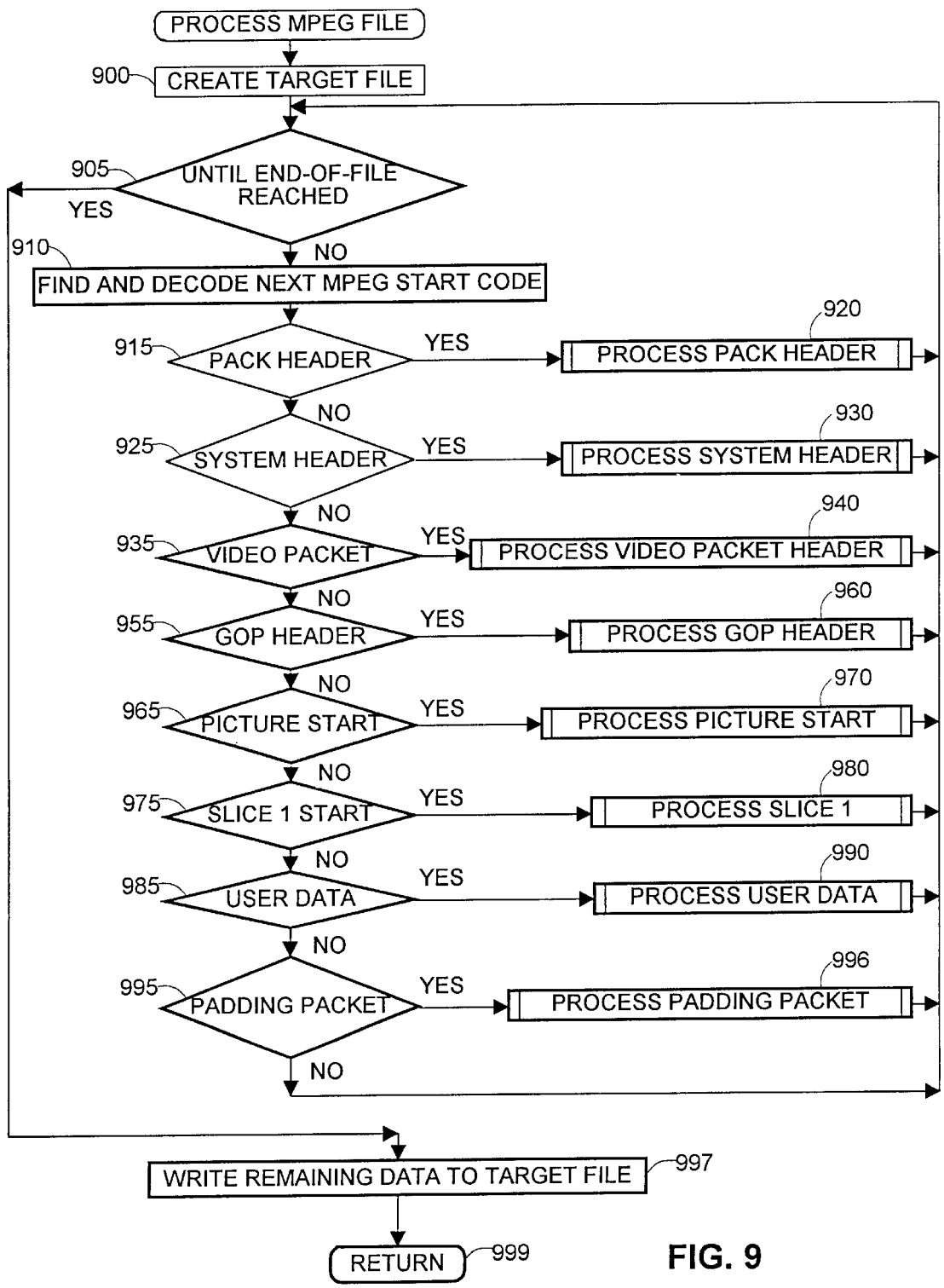
FIG. 9 is a logic flow diagram of a software routine for inserting timecode packets into an MPEG file without perturbation of the compressed audio/video data, according to the preferred embodiments of the present invention.

The main routine of FIG. 6 then proceeds to step 620, to process the MPEG file for timecode insertion, as shown in Process MPEG File routine of FIG. 9. In FIG. 9, the routine starts in step 900 by creating a file for storing the modified MPEG file. In order to maximize application performance, the present invention reads the original MPEG file only once. The logic enters a loop, in step 905, used for the duration of the MPEG file. In this loop the file is sequentially decoded in step 910 to locate and process each MPEG start code. If a pack header start code is found in step 915, the Process Pack Header routine of FIGS. 10A and 10B is called in step 920 to process it.

Figure 10A:
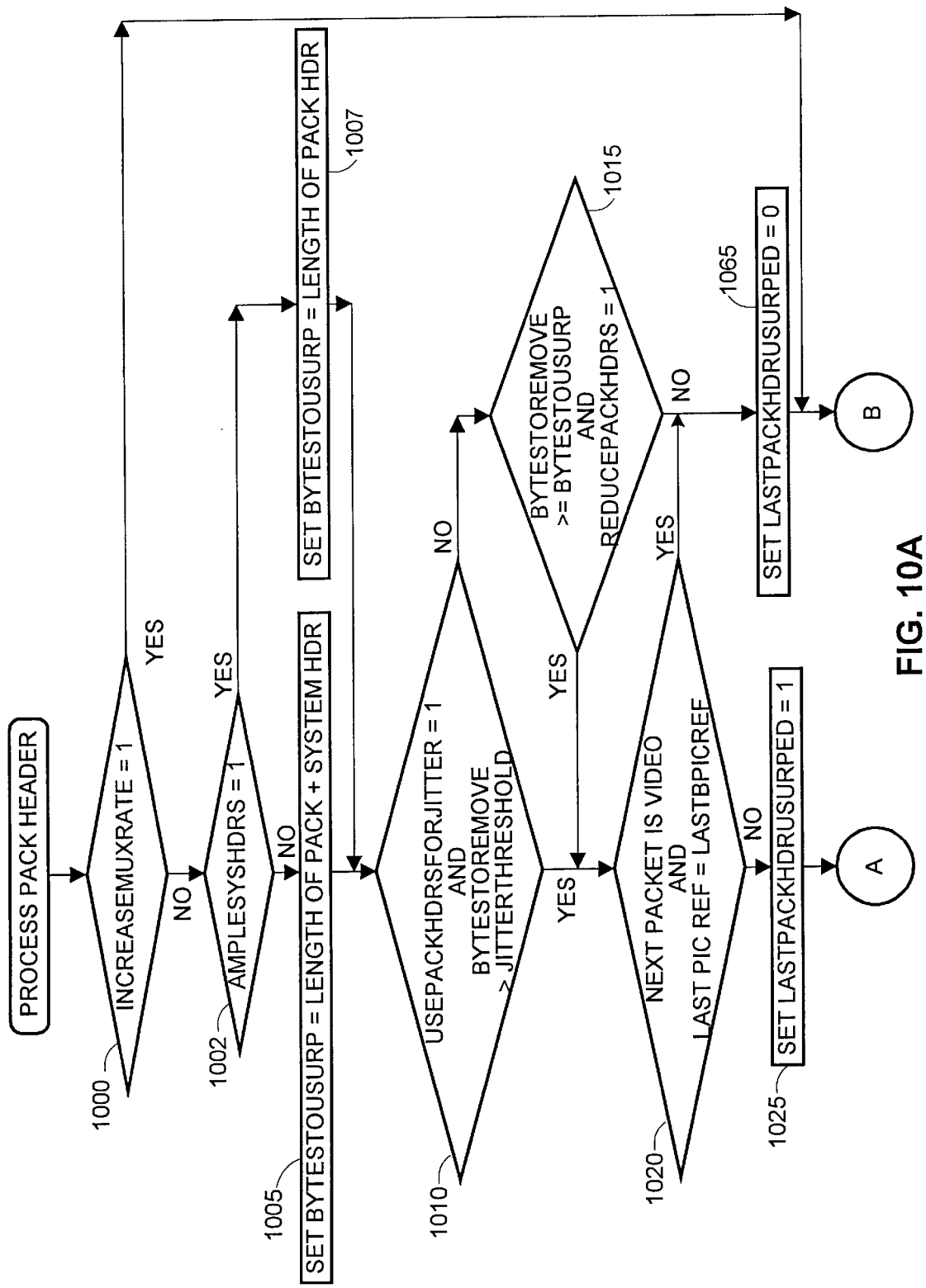
FIGS. 10A and 10B illustrate the logic flow of a software routine for processing MPEG pack headers, according to the preferred embodiments of the present invention.
Figure 10B:
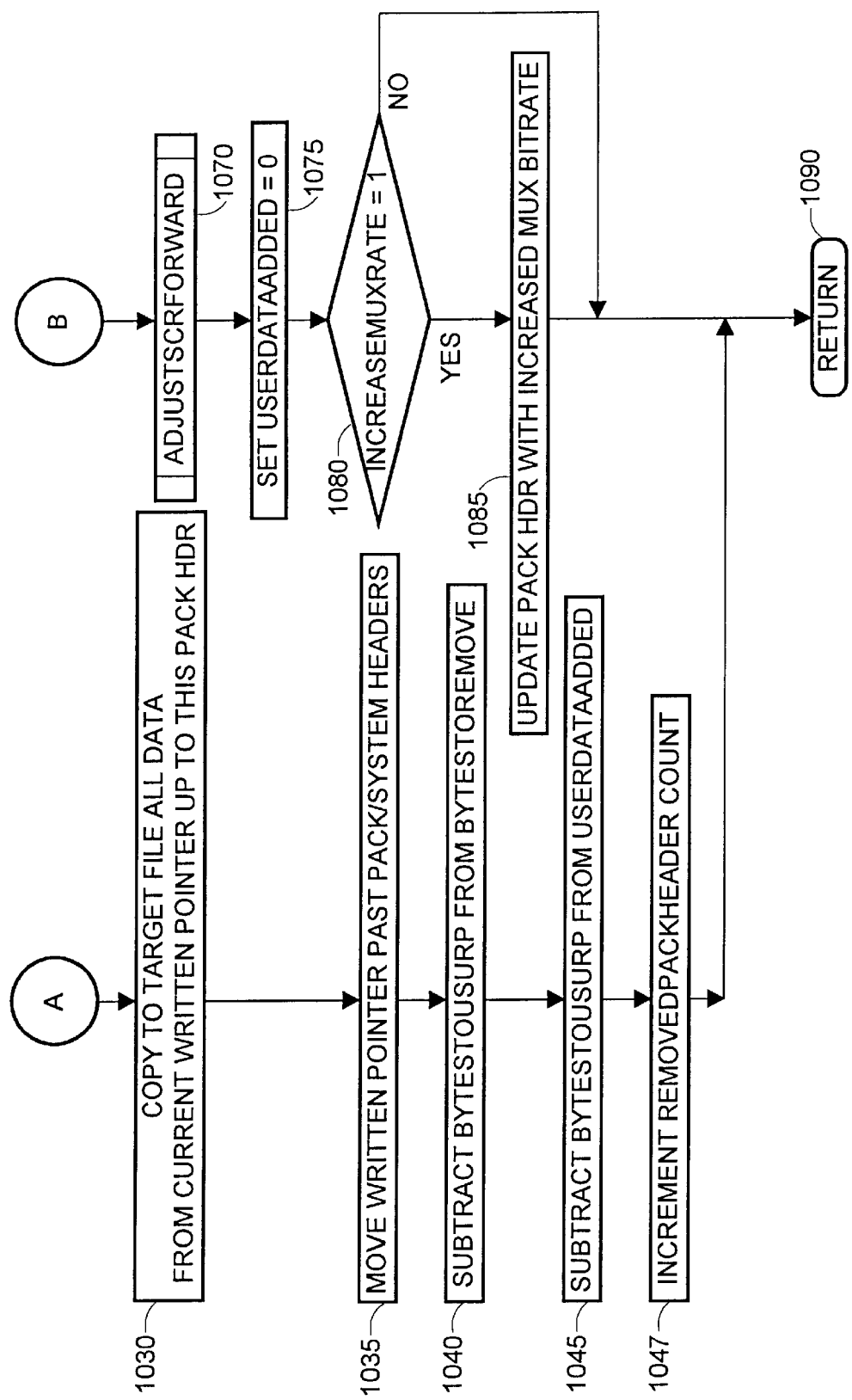

Referring to FIGS. 10A and 10B, in step 1000 the pack header processing begins by checking the operational mode of the application. If, in step 1000 it is found that the IncreaseMuxRate flag is not set to 1, the code falls through and the AmpleSysHdr flag is tested in step 1002 to determine if both the pack and system header should be usurped, or just the pack header itself. Then, the length is set in a BytesToUsurp variable accordingly, in steps 1005 or 1007. A series of tests are then conducted to determine if the pack header should be removed. A BytesToRemove global variable referenced in this routine contains the number of surplus bytes that need to be excised due to the added timecode packet bytes. If pack headers are being used to control jitter, and BytesToRemove variable is found in step 1010 to be greater than the jitter threshold, the logic falls through to step 1020 to test if the next packet is a video packet and if the last picture processed in the file is the B picture preceding a GOP header. The pack and system header immediately preceding a GOP header should not be removed, because they are needed in order to allow an MPEG decoder to randomly access the video file on a GOP boundary. If a no condition results from this test of step 1020, the pack header is selected for removal and a flag is set in step 1025 to record this action.

Returning to step 1010, a no condition results in yet another test in step 1015, to determine if BytesToRemove is greater than or equal to BytesToUsurp and if pack headers have been earmarked for reduction. If the result is the yes condition, the pack header is selected for purging. As the logic advances down the pack header removal path, all data from the original MPEG file up to this pack header that have not been copied to the target file are written to disk in step 1030, and the written pointer is advance to point beyond the pack header in step 1035. The written pointer points to the last byte of the original MPEG file that has been written to the disk. In steps 1040 and 1045, the number of bytes removed are subtracted from BytesToRemove and UserDataAdded variables, respectively. UserDataAdded variable tracks the number of bytes added to the file or subtracted from the file, if it is negative, so that the SCR value can be adjusted forward for the appropriate amount. The RemovedPackHeader counter is then incremented in step 1047, and the routine returns in step 1090.

Figure 11A:
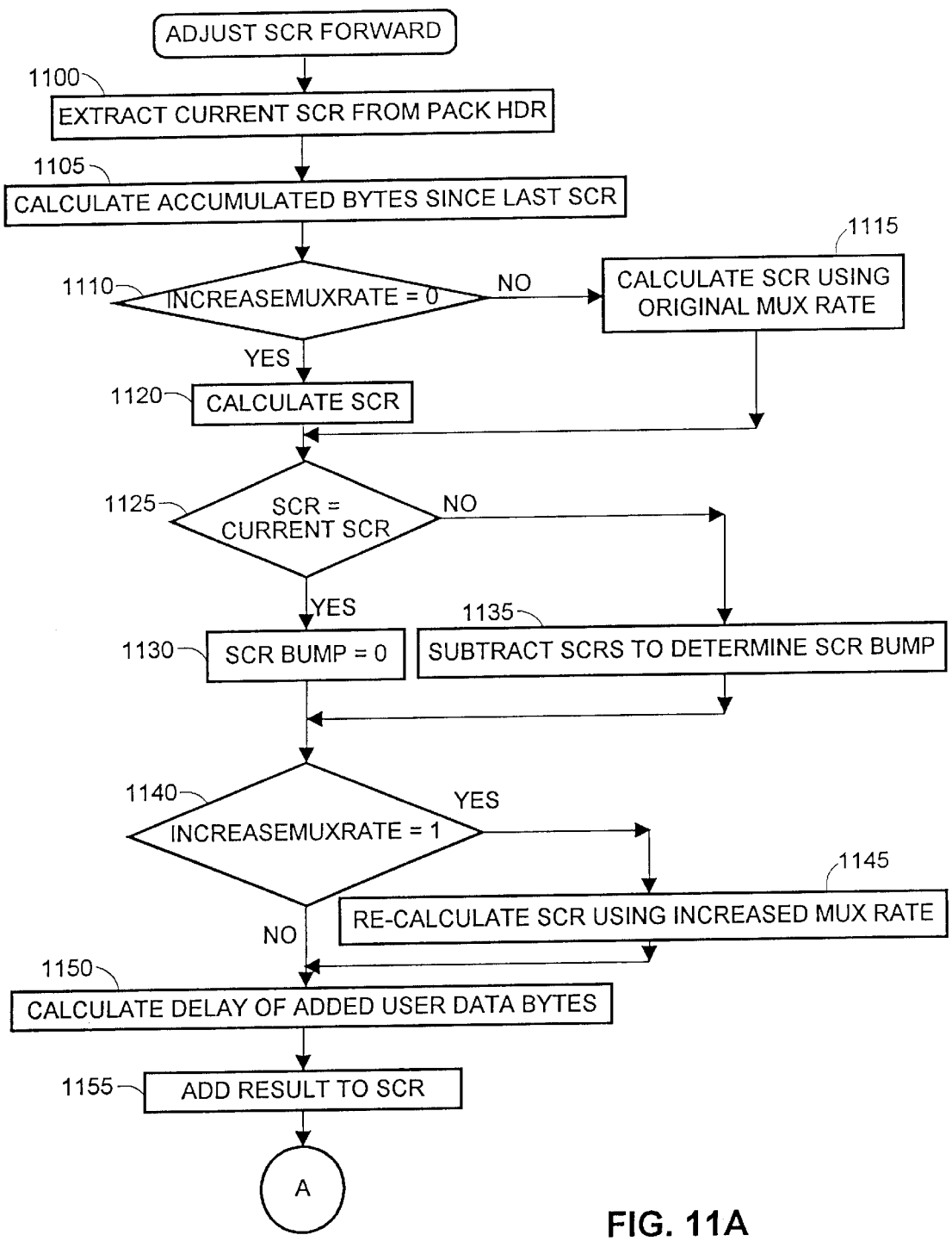
FIGS. 11A and 11B illustrate the logic flow of a software routine for advancing the SCR value in time, according to the preferred embodiments of the present invention.
Figure 11B:
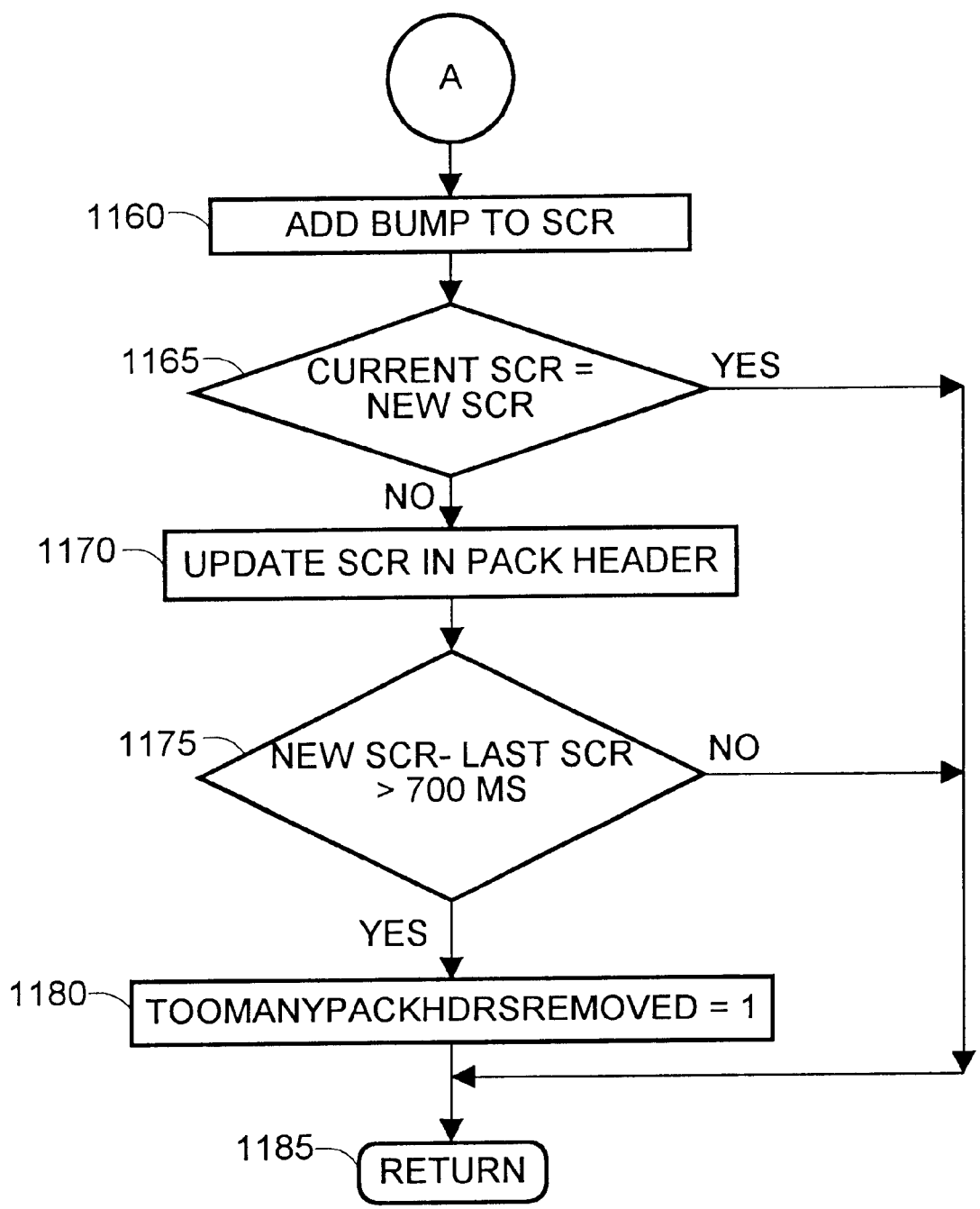

If the pack header is not chosen for reduction, obtained as the no condition in step 1015, or the yes condition in step 1020, the usurped flag is cleared in step 1065, and the Adjust SCR Forward routine of FIGS. 11A and 11B is called to advance the SCR value in time, in step 1070. Upon return, the UserDataAdded variable is zeroed in step 1075. In the data reduction mode of this preferred embodiment, the test for increased multiplex rate fails in step 1080, and the routine returns to the caller in step 1090.

In the Adjust SCR Forward routine of FIGS. 11A and 11B, the current SCR value is extracted from the pack header in step 1100, and the number of bytes accumulated since the last SCR value setting is calculated in step 1105. After testing for an increase in multiplex rate in step 1110, the SCR is calculated in steps 1115 or 1120, and compared to the SCR value in the pack header in step 1125. This test is made to detect artificial incrementing of the SCR value, also referred to as SCR bumping, used by MPEG encoders as a means of bitrate control, in order to maintain VBV fullness. Any SCR bumping must be carried over into the modified MPEG file, to preclude VBV violations. If the SCR values differ in step 1125, the SCR values are subtracted in step 1135 to compute the amount of bump. Otherwise, the SCR bump is set to zero in step 1130. After testing again for an increase in the multiplex rate in step 1140, either the SCR value is recalculated in step 1145, or the additional delay incurred by the addition of the timecode packet bytes is calculated in step 1150, and added to the SCR value in step 1155, along with the SCR bump in step 1160.

At the decision point of step 1165, if the new SCR value is equal to the current SCR value, there is no need to modify the SCR value and the routine returns in step 1185. Otherwise, the SCR value in the pack header is updated in step 1170, and the new SCR value is compared with the last SCR value, in step 1175. If the difference in time is greater than 700 milliseconds, the maximum duration specified by MPEG is exceeded, and a flag is set in step 1180 to log the condition when the application completes. It is most likely the result of too many pack headers being removed. In practice, however, this condition will probably never be detected due to the super abundance of pack headers.

Figure 12:
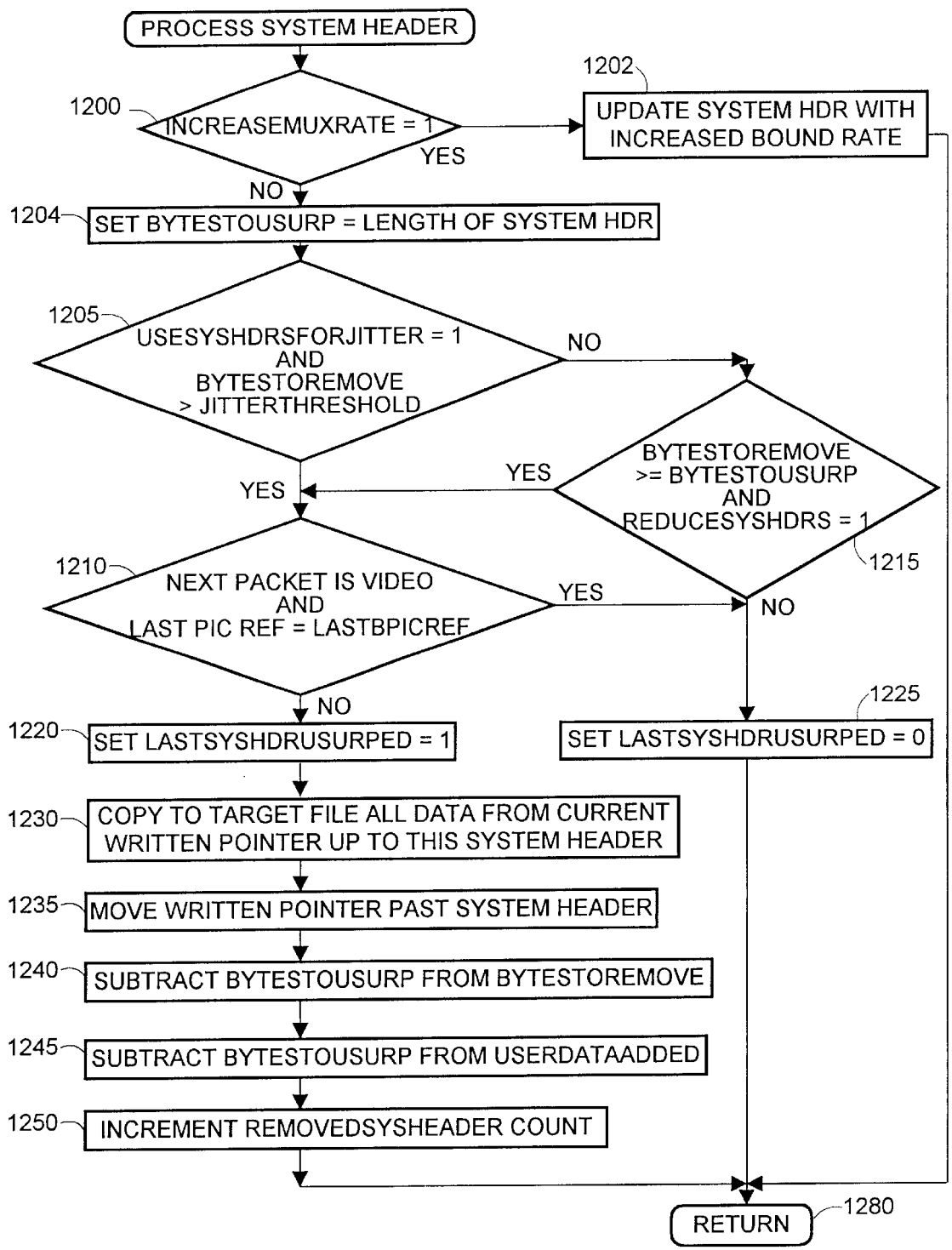
FIG. 12 illustrates the logic flow of a software routine for processing MPEG system headers, according to the preferred embodiments of the present invention.

Returning to FIG. 9, if the start code detected in step 925 is a system header, the Process System Header routine of FIG. 12 is invoked in step 930. At entry point of FIG. 12, the processing mode is tested in step 1200. If IncreaseMuxRate is found to be set to 1, in step 1202 the system header is updated with the increased bound rate, and the routine returns in step 1280. If not, BytesToUsurp flag is set to the length of the system header in step 1204, and a series of tests are conducted in the same manner as in the pack header processing of FIGS. 11A and 11B. If, in step 1205, it is found that the system headers are being used to control jitter, and the BytesToRemove are greater than the jitter threshold, execution falls through to ensure, in step 1210, that the system header does not precede a GOP header. If not, the system header is selected for removal in step 1220. If the test in step 1205 results in the no condition, a further test is made in step 1215 to determine if BytesToRemove value is greater or equal to BytesToUsurp value, and, if not, the system header reduction is enabled in step 1225.

If yes condition is found in step 1215, the system header is selected for removal in step 1220. In a similar manner as pack header removal, the outstanding MPEG data are copied to the target file in step 1230, the written pointer is moved past the system header being removed in step 1235, and BytesToUsurp value is subtracted from BytesToRemove value, in step 1240, and from the UserDataAdded value, in step 1245. The number of system headers is incremented in step 1250 and the routine returns in step 1280. If system headers were not earmarked for removal, a no condition in step 1215, or a yes condition in step 1210, the LastSysHdrUsurped flag is reset in step 1225, and the routine returns in step 1280.

Figure 13A:
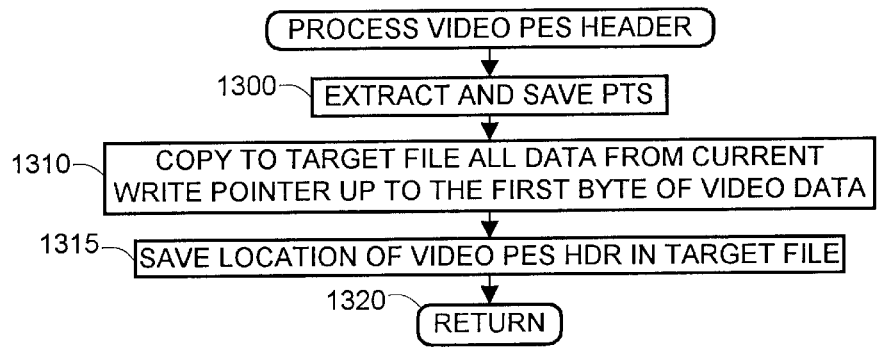
FIG. 13A illustrates the logic flow of a software routine for processing MPEG presentation elementary stream (PES) headers, according to the preferred embodiments of the present invention.
Figure 13B:
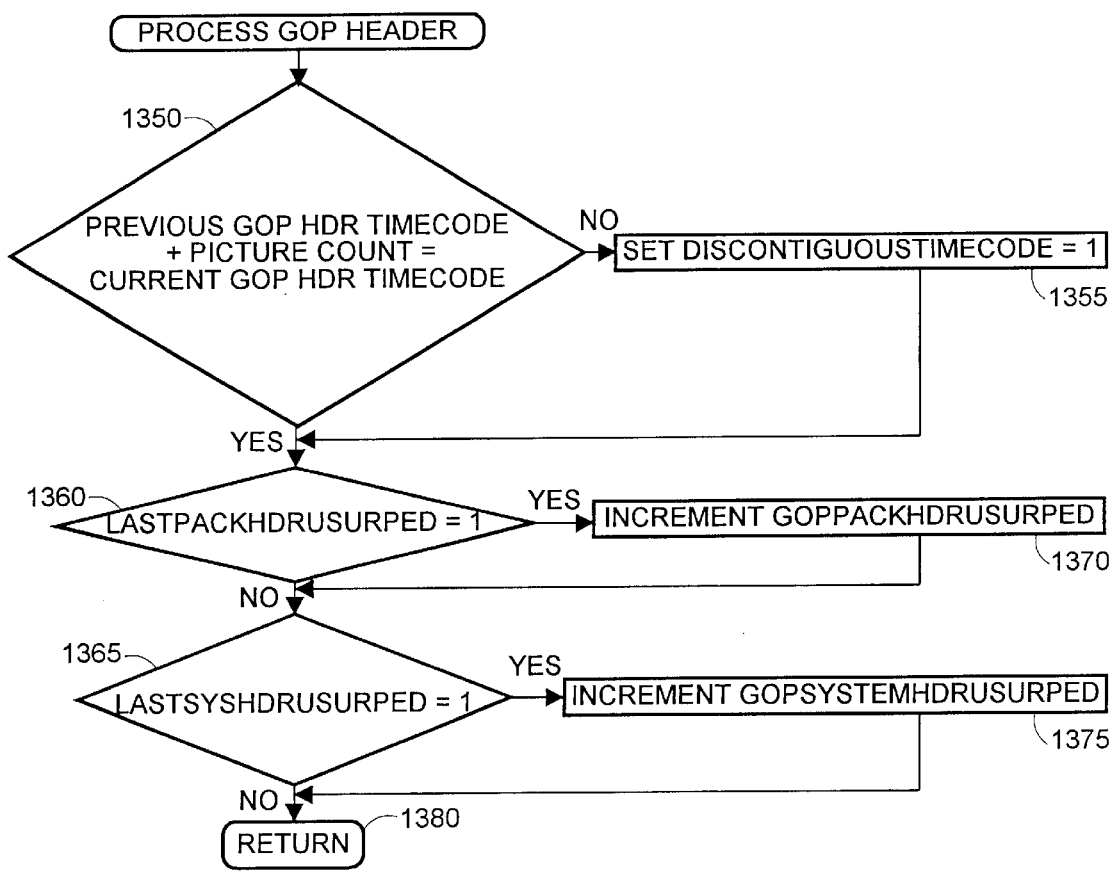
FIG. 13B illustrates the logic flow of a software routine for processing MPEG group of pictures (GOP) headers, according to the preferred embodiments of the present invention.

Returning again to FIG. 9, the next two start codes that are tested in steps 935 and 955 are for the presence of the video PES header and the GOP header. The routines for processing these start codes are Process Video Packet Header of step 940 and Process GOP Header of step 960, illustrated in FIGS. 13A, 13B, respectively. In FIG. 13A, for each video PES found, the PTS is extracted and saved in step 1300, and all outstanding MPEG data are copied to the target file in step 1310, including the video PES header itself. The copying stops at the first byte of video data. Since the video PES header contains the length of the subsequent video packet, the location of where the PES header was written to the new file on the disk is saved in step 1315, in order that it may be readily updated. It will be necessary to modify it, if a timecode packet is inserted into this particular video packet. The routine returns in step 1320.

When GOP headers are encountered, the GOP timecode extracted and saved from the previous GOP header is incremented by the number of pictures detected in between the two GOP headers. If in step 1350 of FIG. 13B it is discovered that the computed timecode (previous GOP header timecode incremented by the picture count) does not match the timecode contained in the current GOP header, the DiscontinuousTimecode flag is set in step 1355, to log a warning at the completion of processing. Additionally, two checks are made to determine if the pack or system header immediately preceding this GOP header were removed. If either the LastPackHdrUsurped flag is found in step 1360 to be set to 1, or the LastSysHdrUsurped flag is found in step 1365 to be set to 1, the respective counter is incremented in step 1370 or 1375, respectively, to alert the library administrator. The routine returns in step 1380.

Figure 14A:
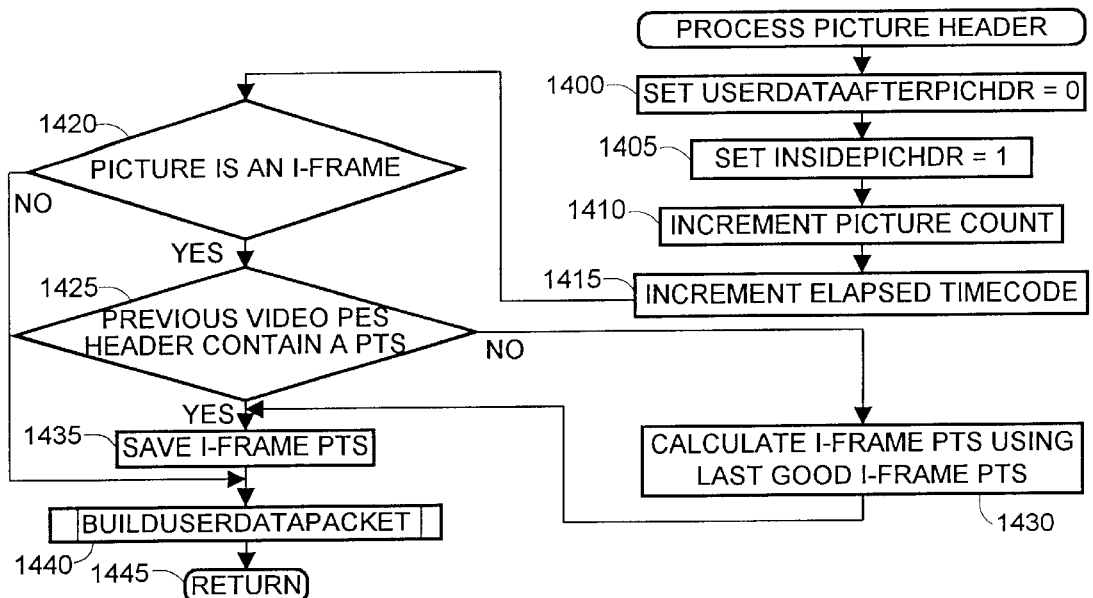
FIG. 14A illustrates the logic flow of a software routine for processing MPEG picture headers, according to the preferred embodiments of the present invention.

Returning again to FIG. 9, the next start code captured and processed in the Process MPEG File routine is the picture start header, tested for in step 965. If found, step 970 invokes the Process Picture Start routine of FIG. 14A. At entry point of FIG. 14A, the global flag UserDataAfterPicHdr is cleared in step 1400, and an additional flag, InsidePicHdr, is set to 1 in step 1405. These flags are used to detect the presence of user data already present in the MPEG stream. The MPEG specification permits the insertion of user data at different points in the stream. The present invention is only concerned with detecting user data packets between the picture start header and the slice 1 header, because that is where the timecode packet is inserted by the preferred embodiments of the present invention. When user data is already present, the user data start code field is removed from the timecode packet and the packet is concatenated with the preexisting user data packet. The signature placed within the timecode packet allows the MPEG decoder to locate the timecode data within the foreign user data packet.

Continuing with picture header processing, in step 1410 the picture count is incremented, and in step 1415 the elapsed timecode is incremented, and the picture type is tested in step 1420 to see if it is an I-frame. If so, a second test is made in step 1425 to see if the previous video PES packet header contained a PTS. If not, in step 1430 a PTS is computed for the present I-frame using the last good I-frame PTS. Next, the PTS is saved in step 1435.

Figure 14B:
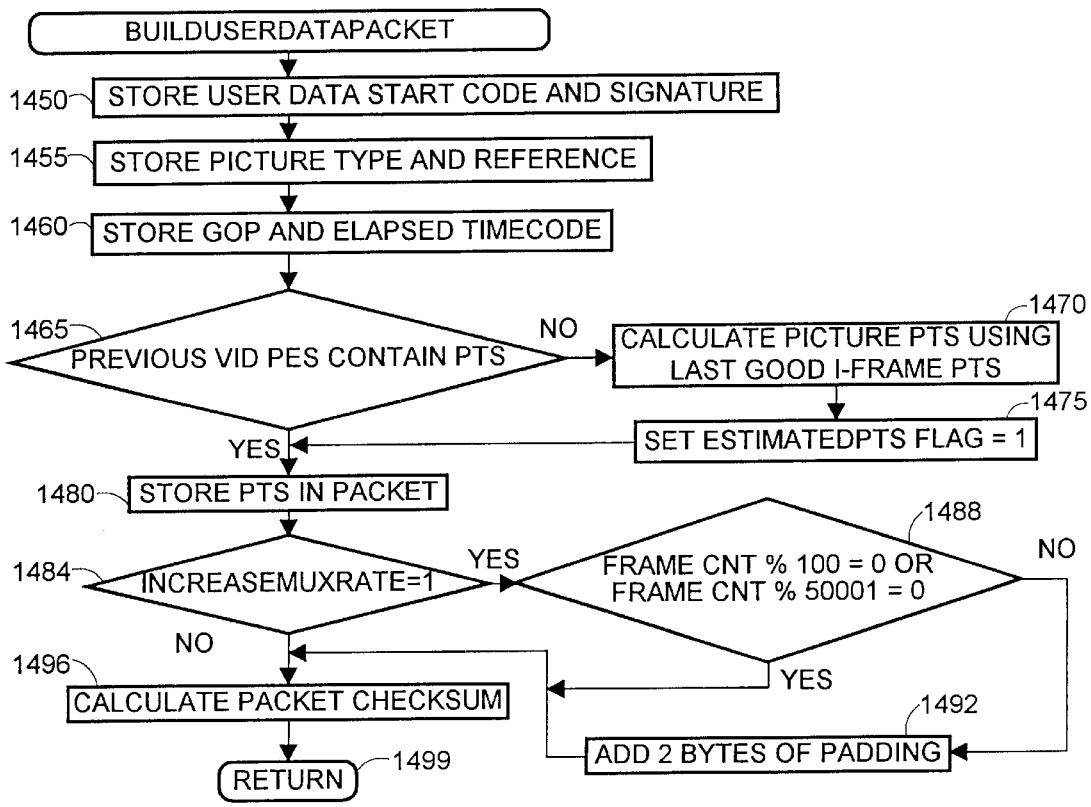
FIG. 14B illustrates the logic flow of a software routine for building user data packets for timecode insertion, according to the preferred embodiments of the present invention.

Build User Data Packet routine of FIG. 14B is then called in step 1440, to construct a timecode packet for timecode insertion, and the routine returns in step 1445. The Build-UserDataPacket routine of FIG. 14B stores the user data start code and signature in step 1450, the picture type and reference are extracted from the picture start header and stored in step 1455. GOP and elapsed timecodes (the absolute and relative timecodes) are stored in step 1460. If in step 1465 it is found that a PTS was not recorded for this picture in the previous video PES header, a PTS is computed in step 1470 using the last good I-frame PTS and picture reference, and the estimated PTS flag is set to 1 in step 1475. Next, the PTS is stored in the packet in step 1480, and with the test for an increased multiplex rate flag failing in step 1485, the execution falls through to step 1496 to calculate and store the packet checksum and return in step 1499. If the test in step 1485 finds an increased multiplex rate flag, in step 1488 it is tested whether the frame count requires step 1492, to add two bytes of padding, as needed in the alternate preferred embodiment of the present invention, described below. The operation then returns to steps 1496 and 1499.

Figures 15A, 15B:
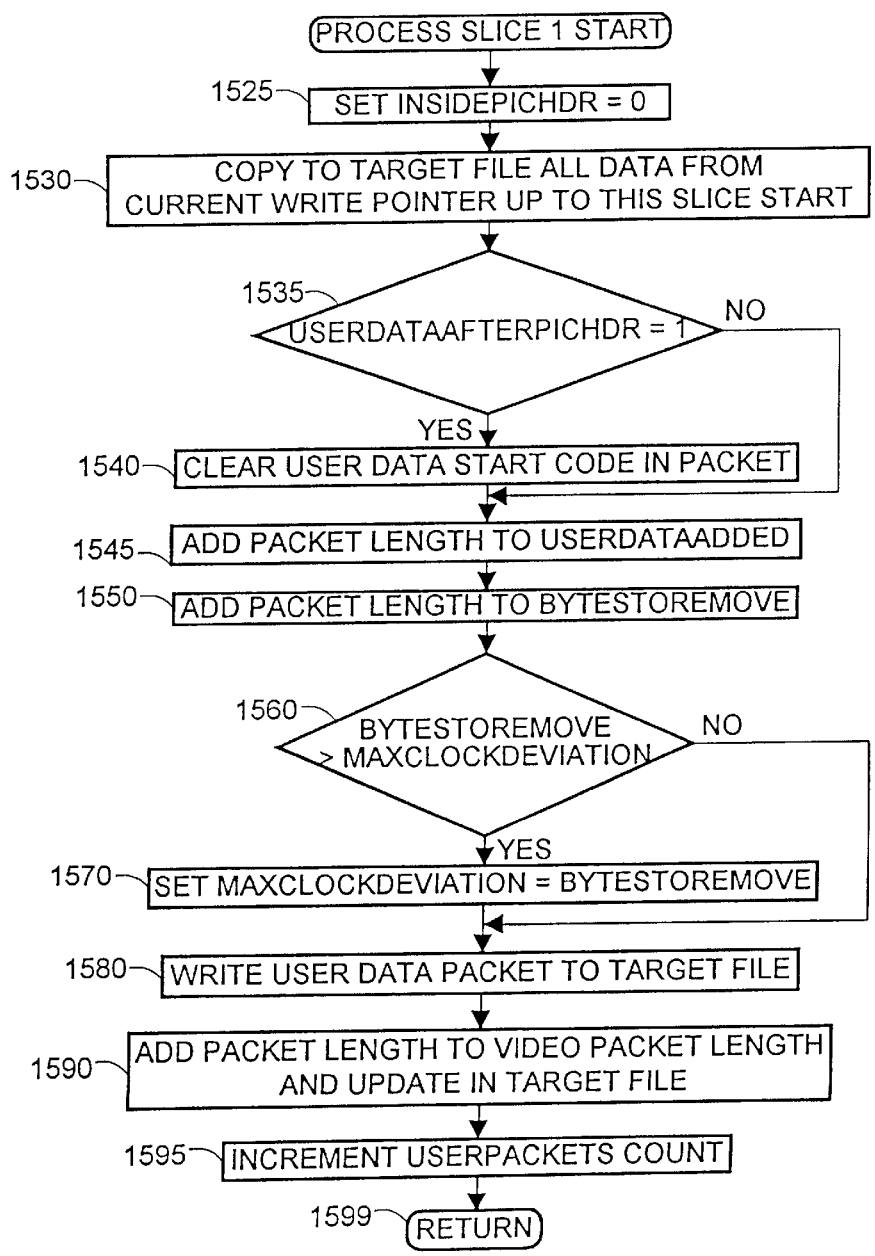
FIG. 15A illustrates the logic flow of a software routine for processing MPEG user data packets, according to the preferred embodiments of the present invention.
FIG. 15B illustrates the logic flow of a software routine for processing MPEG slice 1 headers, according to the preferred embodiments of the present invention.

Returning again to FIG. 9, when processing a user data packet is requested in step 985, step 990 invokes the Process User Data routine of FIG. 15A. In step 1500 of FIG. 15A the global flag InsidePicHdr is tested for the set condition. If set, the UserDataAfterPicHdr flag is set to 1 in step 1505, to signal its presence. The routine returns in step 1510.

Returning again to FIG. 9, when processing a slice 1 header is requested in step 975, in step 980 the processing moves to the Process Slice 1 Start routine of FIG. 15B. In FIG. 15B, the InsidePicHdr flag is reset in step 1525 to disable the monitoring of user data packets. In preparation for the insertion of the timecode packet, all outstanding data up to the slice 1 header are written to the video file on disk, in step 1530. If, in step 1535, the user data was detected after the picture header, the user data start code in the first 4 bytes of the timecode packet are cleared in step 1540, to effectively extend the data to include the preexisting user data packet.

The length of the timecode packet is added to the User-DataAdded variable value in step 1545, and to the BytesToRemove variable value in step 1550, and the BytesToRemove variable is tested in step 1560 to determine if it has reached a new high water mark. If so, the BytesToRemove value is recorded in step 1570 in the MaxClockDeviation variable, which is used to track the highest number of accumulated surplus bytes, which equates to SCR clock deviation. The timecode packet is then written to the modified (target) file in step 1580, and the length of the present video packet, already written to the target file, is updated in step 1590 in the video packet length field of the target file, to reflect the increased size. Lastly, the number of timecode packets inserted is used to increment the user packet count in step 1595, and the routine returns in step 1599.

Figure 16:
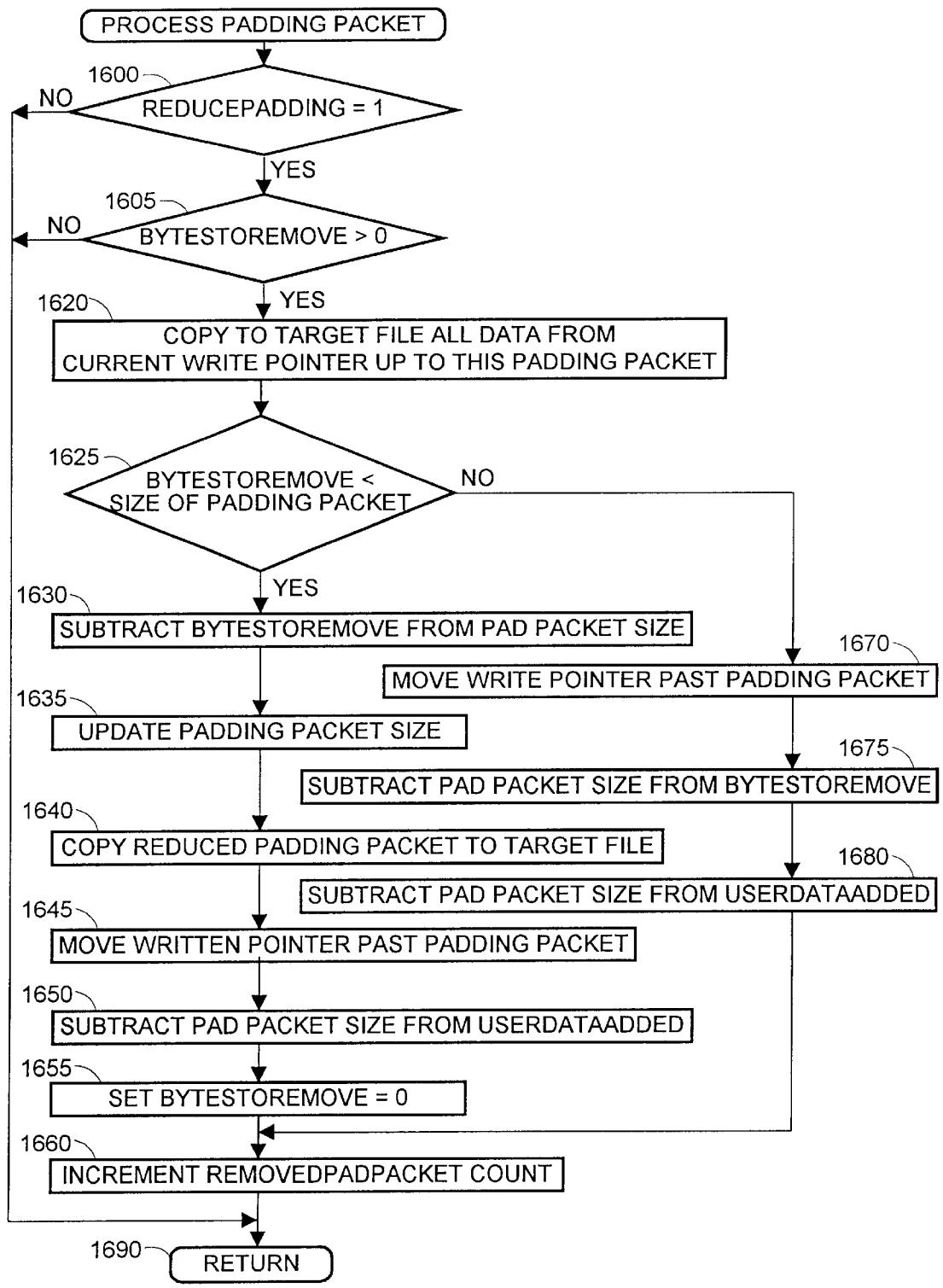
FIG. 16 illustrates the logic flow of a software routine for processing MPEG padding packets, according to the preferred embodiments of the present invention.

Returning again to FIG. 9, when the processing padding packet start codes is requested in step 995, step 996 invokes the Process Padding Packets routine of FIG. 16, to remove padding data, as needed to counterbalance the surplus data bytes. When the end-of-file is reached in step 905 of FIG. 9, in step 997 the routine writes the remaining data from the video file into the target file and returns in step 999.

In step 1600 of FIG. 16 a test is made to determine if padding removal is enabled, and whether there are bytes to remove, as tested in step 1605. If not, the routine returns in step 1690. Otherwise, all outstanding data are written to the disk in step 1620. In step 1625, the number of bytes to be removed is compared with the size of the padding packet. If the BytesToRemove value is less than the packet size, the yes condition, in step 1630 the BytesToRemove value is subtracted from the padding packet size, and the packet header size is updated with the reduced size, in step 1635. The reduced padding packet is then written to the target file in step 1640, and the written pointer is moved past the padding packet, in step 1645. The process is completed in step 1650 by subtracting the BytesToRemove value from the UserDataAdded value, clearing the BytesToRemove flag in step 1655, and incrementing the count of removed/altered padding packets in step 1660.

If the BytesToRemove value exceeds the size of the padding packet in step 1625, in step 1670 the written pointer is simply moved past the padding packet to remove it entirely, and the padding packet size is subtracted from both the BytesToRemove value, in step 1675, and the UserDataAdded value, in step 1680. Next, the step 1660 is executed. The routine returns in step 1690.

Figure 17:
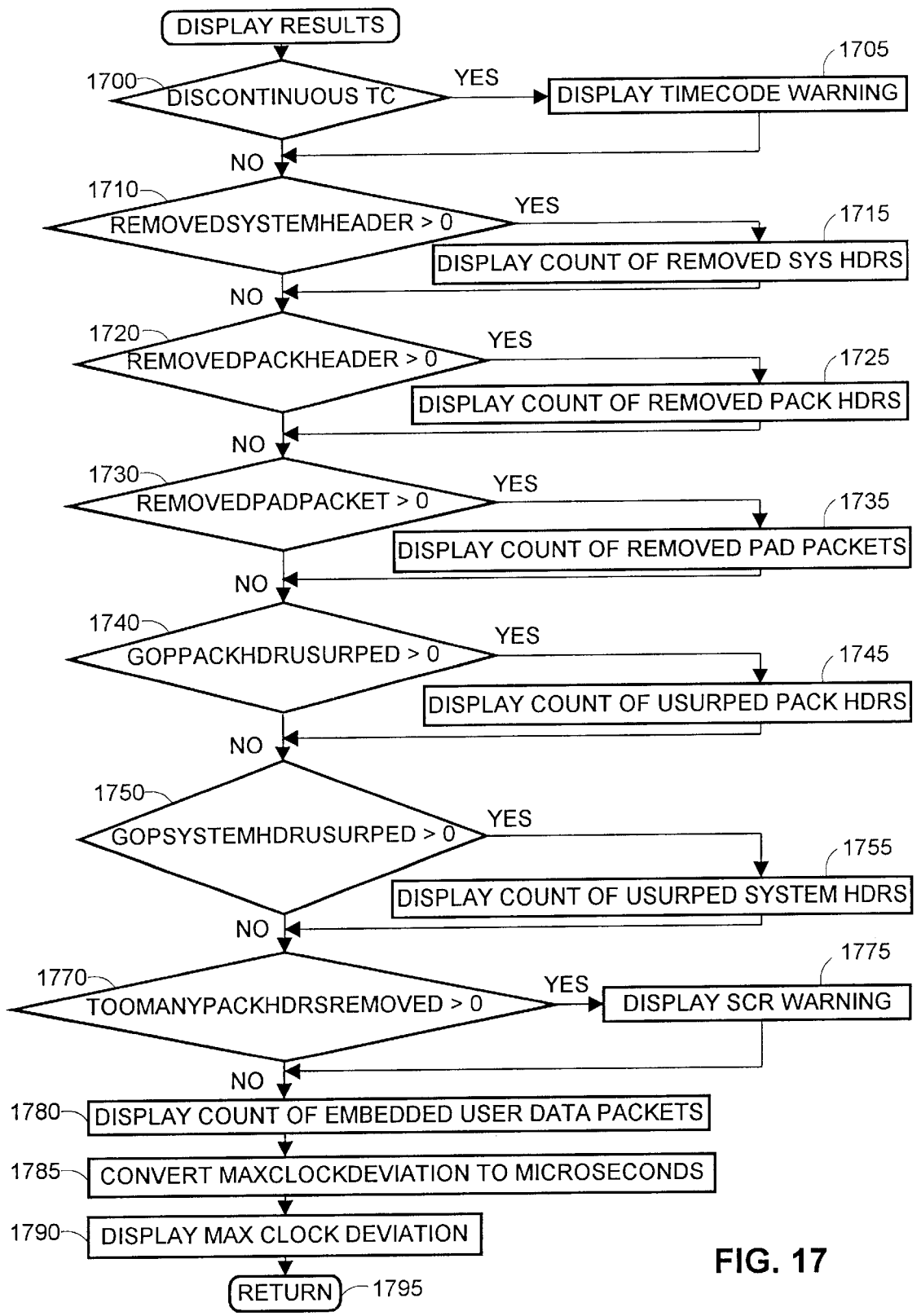
FIG. 17 depicts the logic flow of a software routine for displaying the results of the timecode insertion process, according to the preferred embodiments of the present invention.

Returning now to FIG. 6, when it is found, in step 625, that the system is not operating in the increase multiplex rate mode, the main routine calls, in step 630, the Display Results routine of FIG. 17, upon completion of file processing, to display and/or log the results of the timecode insertion process. Although in the preferred embodiment of the present invention the insertion of timecode packets is automated, the application can also be invoked manually, by an administrator or engineer. When it is automated via workflow manager 235, the present invention logs the results to a library database, to be preserved as metadata as a permanent part of the library catalog record.

Referring now to FIG. 17, if the discontinuous timecode flag is found to be set in step 1700, a warning is generated and displayed in step 1705, and the logic proceeds to dump the statistics of the timecode insertion processing. If found to exist in steps 1710, 1720 or 1730, the number of removed system headers is displayed in step 1715, the number of removed pack headers is displayed in step 1725, and the number of removed padding packets is displayed in step 1735. If the usurpation of the GOP pack header is found in step 1740, the number of usurped pack headers is displayed in step 1745. If the usurpation of the system header is found in step 1750, the number of usurped system headers is displayed in step 1755. If it is found in step 1770 that too many pack headers have been removed, making an excessive gap in SCR values, a display SCR warning is displayed in step 1775 to alert the administrator. Finally, the number of inserted timecode packets is displayed in step 1780, and the maximum clock deviation value is converted from a byte count to time in step 1785, based on the multiplex bitrate, and it is displayed in step 1790. The routine returns in step 1795.

Figure 18:
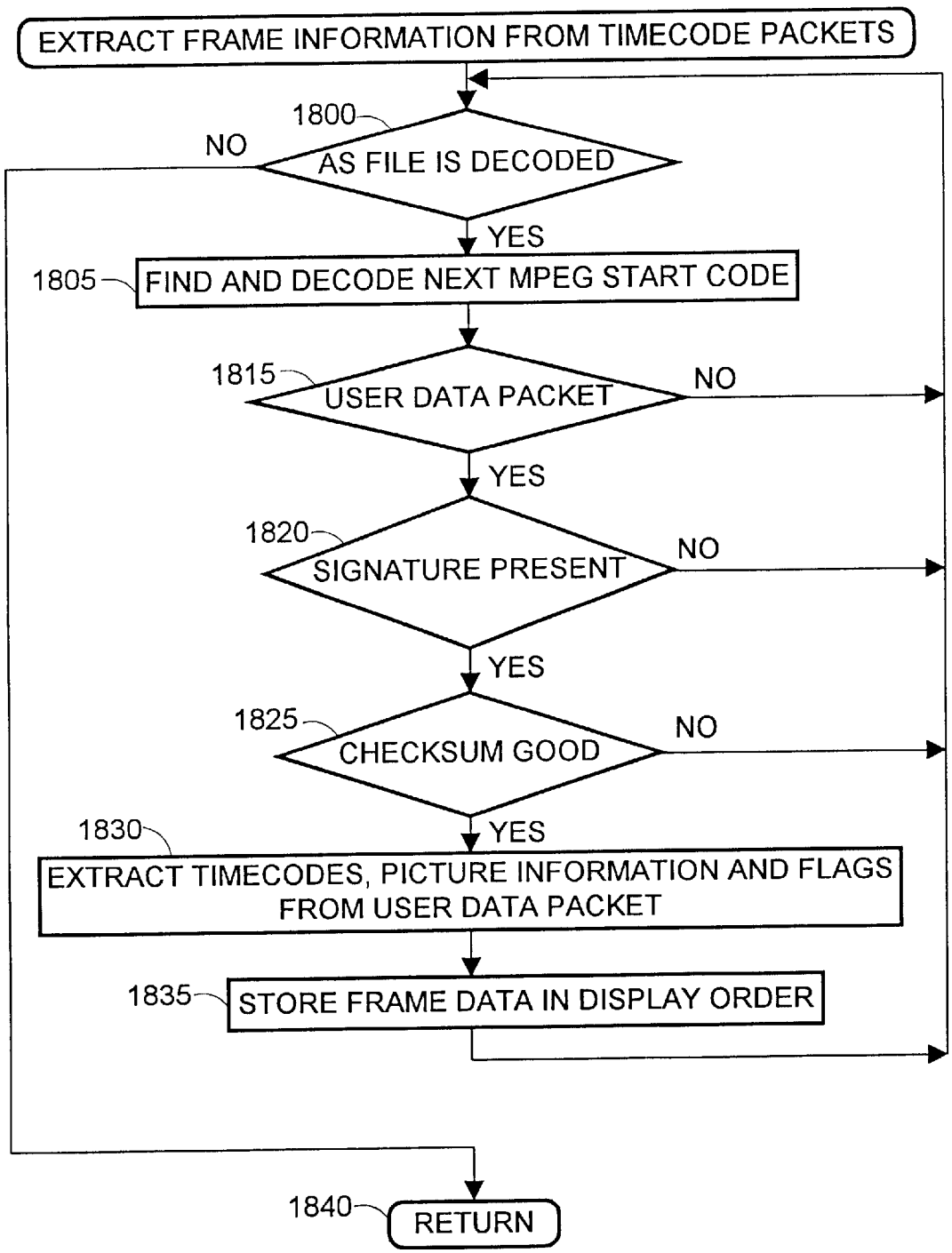
FIG. 18 depicts the logic flow of a software routine used by an MPEG decoder to extract the timecode packets from an incoming MPEG stream, according to the preferred embodiments of the present invention.

The timecode packets are extracted, decompressed and stored into global memory by the MPEG decoder/player, as the file is decoded. The timecode information obtained by the preferred embodiments of the present invention can be referenced by any application via an API interface. The flow chart of the routine used to extract and decompress the timecode packet is illustrated in FIG. 18. The decoding iteration is started in step 1800. Each MPEG start code of the MPEG file is found and decoded in step 1805. If a user data packet is detected in step 1815, the packet is searched for a timecode packet signature in step 1820. If a signature is found, and the packet checksum validates in step 1825, the frame timecode, picture and flag information from the user data packet is extracted in step 1830, and frame data is stored in frame display order, in step 1835. A no condition in steps 1815, 1820 or 1825 results in the next iteration of the loop, started in step 1800. The loop exits when the whole video file decoding has been completed, in step 1840.

Figure 19:
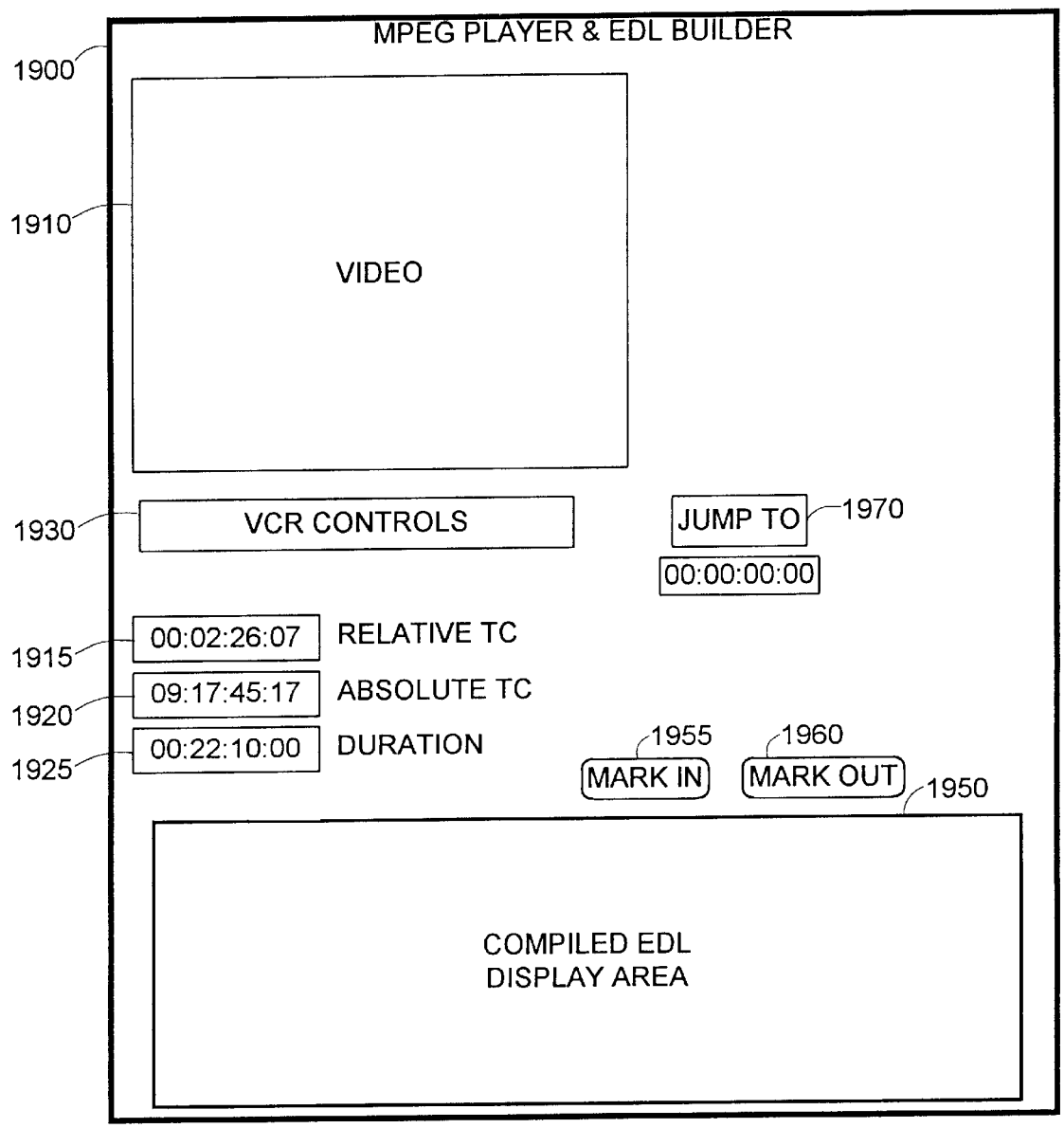
FIG. 19 is an illustration of the graphical user interface (GUI) of the MPEG player and the EDL builder, used by a video cataloging application to display streaming video and metadata, according to the preferred embodiments of the present invention.

The layout of a display of an MPEG decoder/player and the EDL builder 1900 with a graphical user interface (GUI) is illustrated in FIG. 19. A video display area 1910 reflects a playing video with a current position of 00:02:26:07, and there is a VCR controls panel 1930, and a jump to button 1970. The lower portion of the window provides a display area 1950, for the EDL that has been thus far compiled. A relative timecode 1915, absolute timecode 1920, and duration 1925 of the current frame are displayed. The timecodes are captured by the application in response to the end user clicking a mark-in button 1955 and mark-out button 1960, to define the starting and ending frames of a video clip.

In an alternate preferred embodiment of the present invention, the multiplex bitrate is increased to absorb the added data bytes, allowing the timecode packets to be inserted without modifying the DTS/PTS timing. The present invention preferably utilizes timecode packet size of 20 bytes, or 4,800 bps, at a 30 frames per second display rate, complying with the MPEG requirement that the multiplex rate be set in units of 400 bps. However, since the precise frame rate is 29.97 frames per second, the actual bitrate becomes 4804.804 bits per second, which results in an objectionable SCR timing drift, with respect to the unmodified PTS/DTS timestamps of roughly 16 milliseconds per hour. This timing drift is corrected by removing the 2 padding bytes at the end of the timecode packet every 100 frames and 50,000 frames.

This alternate preferred embodiment of the present invention necessitates only a modest change in logic flow of FIGS. 6, 7, 10, 12 and 14B. In the Analyze MPEG File routine of FIGS. 7A and 7B, the yes condition in step 710 bypasses the operation of analyzing 10 seconds of video, as described previously, and the logic proceeds to step 712 to save the original file multiplex bitrate, to step 714 to boost the rate by 4800 bps, and to step 716 to store the rate. When control is returned to the main routine of FIG. 6, the test for the increased multiplex rate in step 610 causes the logic to fall through, thus precluding the invocation of the Determine Reduction Method routine. As a result, the global variables that enable the data removal mode (i.e., ReducePadding, ReducePackHdrs, ReduceSysHdrs, UseSysHdrsForJitter, etc.) are not set, and the associated logic gated by these flags is bypassed.

In the Process Pack Header routine of FIGS. 10A and 10B, when the initial test in step 1000 detects the increased multiplex rate mode, the execution advances to forwardly adjust the SCR value, in step 1070. UserDataAdded flag is reset in step 1075. In step 1080 it is tested whether there is an increase in multiplex rate, and, if so, the multiplex bitrate in the pack header is updated in step 1085, to reflect the upward adjustment. Likewise, in the Process System Header routine of FIG. 12, when the increased multiplex rate is detected in step 1200, the processing is limited to updating a bound rate field in the system header, in step 1202, which is equivalent to increasing the multiplex rate. Lastly, in the Build User Data Packet routine of FIG. 14B, if the test in step 1485 finds an increased multiplex rate flag, the frame count is examined in step 1488 to determine if it is evenly divisible by either 100 or 50001. If not, two padding bytes are added to the timecode packet in step 1492, to extend its length to 20 bytes.

With the preferred embodiments of the present invention it is possible to place timecodes in user data fields which are not proprietary data. Furthermore, they offer high compression rate of the timecode packet, where timecodes in the SMPTE format are stored in into MPEG encoded files, created by any vendor MPEG encoder, for the purpose of obtaining a frame accurate timecode identification. Additionally, the timecode data can be extracted by any MPEG decoder, even when operating in trick mode, or when randomly accessing the video file, without altering the original presentation timing, while ensuring error-free decoding.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of post-processing a previously encoded and multiplexed MPEG video file for frame accurate timecode identification of each individual video frame, comprising the following steps:

(a) analyzing the MPEG video file to determine the best method of concealing the removal of redundant data bytes to allow the insertion of timecode packets without modifying the original multiplex bitrate;

(b) for each, video frame of the MPEG video file, creating a compressed timecode packet having an identifying signature, an absolute timecode of the frame, a relative timecode of the frame, a picture type and a picture reference, wherein the timecodes having the SMPTE timecode format HH:MM:SS:FF; and (c) modifying the MPEG video file by inserting in a header of each video frame of the MPEG video file the corresponding compressed timecode packet and adjusting the subsequent system clock reference timing values accordingly, while maintaining the MPEG video file's original frame presentation timing, thereby preserving the MPEG compliance and compressed audio/video data of the MPEG video file.

2. The method according to claim 1, wherein the timecode packet being automatically inserted in a user data packet of the video frame, between a picture start header and a first slice header.

3. The method according to claim 1, wherein the step of inserting the timecode packet including a step of periodically removing the MPEG video file unused data bytes, equal in number with the inserted timecode packet bytes, for preserving the MPEG video file original size and multiplex bitrate.

4. The method according to claim 1, wherein the step of inserting the timecode packet including a step of increasing the MPEG video file original multiplex bitrate, to compensate for additional timecode packet bytes inserted into the MPEG video file.

5. A system for post-processing a previously encoded and multiplexed MPEG video file for frame accurate timecode identification of each individual video frame, comprising:

a computer coupled to an electronic storage device for storing the MPEG video file;

programming means, performed by the computer, for analyzing the MPEG video file to determine the best method of concealing the removal of redundant data bytes to allow the insertion of timecode packets without modifying the original multiplex bitrate;

programming means, performed by the computer, for creating for each video frame of the MPEG video file a compressed timecode packet having an identifying signature, an absolute timecode of the frame, a relative timecode of the frame, a picture type and a picture reference, wherein the timecodes having the SMPTE timecode format HH:MM:SS:FF; and programming means, performed by the computer, for modifying the MPEG video file by inserting in a header of each video frame of the MPEG video file the corresponding compressed timecode packet and adjusting the subsequent system clock reference timing values accordingly, while maintaining the MPEG video file's original frame presentation timing, thereby preserving the MPEG compliance and compressed audio/video data of the MPEG video file.

6. The system according to claim 5, wherein the timecode packet being automatically inserted in a user data packet of the video frame, between a picture start header and a first slice header.

7. The system according to claim 5, wherein the means for inserting the timecode packet further comprising means for periodically removing the MPEG video file unused data bytes, equal in number with the inserted timecode packet bytes, for preserving the MPEG video file original size and multiplex bitrate.

8. The system according to claim 5, wherein the means for inserting the timecode packet further comprising means for increasing the MPEG video file original multiplex bitrate, to compensate for additional timecode packet bytes inserted into the MPEG video file.

9. A program storage device readable by a computer tangibly embodying a program of instructions executable by the computer to perform method steps of post-processing a previously encoded and multiplexed MPEG video file for frame accurate timecode identification of each individual video frame, the MPEG video file stored in an electronic storage device coupled to the computer, the method comprising the following steps:

(a) analyzing the MPEG video file to determine the best method of concealing the removal of redundant data bytes to allow the insertion of timecode packets without modifying the original multiplex bitrate;

(b) for each frame of the MPEG video file, creating a compressed timecode packet having an identifying signature, an absolute timecode of the frame, a relative timecode of the frame, a picture type and a picture reference, wherein the timecodes having the SMPTE timecode format HH:MM:SS:FF; and (c) modifying the MPEG video file by inserting in a header of each video frame of the MPEG video file the corresponding compressed timecode packet and adjusting the subsequent system clock reference timing values accordingly, while maintaining the MPEG video file's original frame presentation timing, thereby preserving the MPEG compliance and compressed audio/video data of the MPEG video file.

10. The method according to claim 9, wherein the timecode packet being automatically inserted in a user data packet of the frame, between a picture start header and a first slice header.

11. The method according to claim 9, wherein the step of inserting the timecode packet including a step of periodically removing the MPEG video file unused data bytes, equal in number with the inserted timecode packet bytes, for preserving the MPEG video file original size and multiplex bitrate.

12. The method according to claim 9, wherein the step of inserting the timecode packet including a step of increasing the MPEG video file original multiplex bitrate, to compensate for additional timecode packet bytes inserted into the MPEG video file.

* * * * *